US009201613B2

(12) United States Patent
Kono et al.

(10) Patent No.: US 9,201,613 B2
(45) Date of Patent: *Dec. 1, 2015

(54) COMPUTER SYSTEM, MANAGEMENT METHOD OF THE COMPUTER SYSTEM, AND PROGRAM

(71) Applicant: Hitachi, Ltd., Tokyo (JP)

(72) Inventors: Yasutaka Kono, Yokohama (JP); Junichi Hara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/458,866

(22) Filed: Aug. 13, 2014

(65) Prior Publication Data

US 2014/0351407 A1 Nov. 27, 2014

Related U.S. Application Data

(63) Continuation of application No. 13/130,001, filed as application No. PCT/JP2011/053322 on Feb. 17, 2011, now Pat. No. 8,812,642.

(30) Foreign Application Priority Data

Jan. 26, 2011 (JP) .................................. 2011-014257

(51) Int. Cl.
*G06F 3/06* (2006.01)
*G06F 12/06* (2006.01)

(52) U.S. Cl.
CPC .............. *G06F 3/067* (2013.01); *G06F 3/0604* (2013.01); *G06F 3/0605* (2013.01); *G06F 3/0629* (2013.01); *G06F 12/0653* (2013.01)

(58) Field of Classification Search
CPC ... G06F 3/0601; G06F 3/0604; G06F 3/0605; G06F 12/0653; G06F 3/067; G06F 3/0629
USPC ................... 709/223, 224, 225, 226
See application file for complete search history.

(56) References Cited

U.S. PATENT DOCUMENTS 7,305,462 B2 12/2007 Nakamura et al.
7,913,290 B2 * 3/2011 Ohta et al. ........................ 726/1
(Continued)

FOREIGN PATENT DOCUMENTS

JP 2002-063063 A 2/2002
JP 2003-108420 4/2003
(Continued)

OTHER PUBLICATIONS

International Search Report cited in related International Patent Application No. PCT/JP2011/053322, completed Mar. 30, 2011.
Written Opinion of the International Searching Authority cited in related International Patent Application No. PCT/JP2011/053322, completed Mar. 30, 2011.

*Primary Examiner* — Mang Yeung
*Assistant Examiner* — Natali N Pascual Peguero
(74) *Attorney, Agent, or Firm* — Foley & Lardner LLP

(57) ABSTRACT

Provided is a technique capable of efficient comprehensive management of a system, even if the system is a large-scale storage system. Management software acquires configuration information of a storage system (computer system) in two stages. In a first stage, the management software acquires only basic information of resources (identifiers of resources, the number of resources, and relationship between the resources) included in storage subsystems, host computers, switches, hubs, and the like. The management software determines a range and timing of acquiring detailed configuration information and necessity of holding the detailed configuration information based on the acquired basic information. In a second stage, the management software acquires the detailed configuration information of an appropriate range at appropriate timing. The management software always holds the basic information, but holds the detailed information only necessary to hold.

7 Claims, 25 Drawing Sheets

(56) References Cited

U.S. PATENT DOCUMENTS

| | | |
|---|---|---|
| 2001/0054093 A1 | 12/2001 | Iwatani |
| 2003/0055529 A1* | 3/2003 | Aosawa ......................... 700/220 |
| 2003/0061331 A1* | 3/2003 | Nakamura et al. ............ 709/223 |
| 2003/0221077 A1 | 11/2003 | Ohno et al. |
| 2005/0198434 A1 | 9/2005 | Uchiumi et al. |
| 2006/0120292 A1 | 6/2006 | Yardeni et al. |
| 2007/0220376 A1 | 9/2007 | Furukawa |
| 2009/0235269 A1* | 9/2009 | Nakajima et al. ............. 718/104 |
| 2009/0327945 A1 | 12/2009 | Tomizawa |

FOREIGN PATENT DOCUMENTS

| | | |
|---|---|---|
| JP | 2004-005370 | 1/2004 |
| JP | 2005-250925 | 9/2005 |
| JP | 2007-249441 | 9/2007 |
| WO | WO-2010/150312 A1 | 12/2010 |

\* cited by examiner

| Initiator ID | Target ID | LUN |
|---|---|---|
| 00.00.00.00.11.11.11.11 | 11.11.11.11.22.22.22.22 | 1 |
| 00.00.00.00.22.22.22.22 | 11.11.11.11.33.33.33.33 | 3 |
| : | : | : |

| LUN | Segment ID | Volume LBA Area | Physical Resource ID | LBA Area |
|---|---|---|---|---|
| 1 | 0 | 0-999 | Drive.1 | 0-999 |
| 1 | 1 | 1000-1999 | Drive.1 | 1000-1999 |
| 2 | 0 | 0-999 | Drive.2 | 0-999 |
| 2 | 1 | 1000-1999 | Drive.3 | 0-999 |
| 2 | 2 | 2000-2999 | — | — |
| : | : | : | : | : |

| Storage ID | Total Capacity | Total Free Capacity | Total Number of Volumes | Last Failure Date/Time | Management Operation Frequency | Implementation Year/Month /Day |
|---|---|---|---|---|---|---|
| ST.1 | null | null | 1000 | null | null | null |
| ST.2 | 5 TB | 4 TB | 10000 | 2010/11/19 03:30:15 | 5 Times/Hour | 2006/04/01 |
| ST.3 | 10 TB | 8 TB | 20000 | 2010/06/05 14:20:40 | 1 Time/Hour | 2009/04/01 |
| ⋮ | ⋮ | ⋮ | ⋮ | ⋮ | ⋮ | ⋮ |

FIG. 7

| Storage ID | Volume ID | Capacity | RAID Level | Media Type | Pool ID | State |
|---|---|---|---|---|---|---|
| ST.1 | LU.1 | null | null | null | null | null |
| ST.1 | LU.2 | null | null | null | null | null |
| ST.2 | LU.1 | 100 GB | RAID5 | SATA | Pool.1 | Error |
| ST.2 | LU.2 | 200 GB | RAID5 | SSD | Pool.2 | Normal |
| ⋮ | ⋮ | ⋮ | ⋮ | ⋮ | ⋮ | ⋮ |

Columns: 41320, 41321, 41322, 41323, 41324, 41325, 41326

FIG. 8

| Storage ID | Pool ID | Capacity | Free Capacity | Pool Type | State |
|---|---|---|---|---|---|
| ST.1 | Pool.1 | null | null | null | null |
| ST.1 | Pool.2 | null | null | null | null |
| ST.2 | Pool.1 | 2 TB | 2 TB | RAID Group | Error |
| ST.2 | Pool.2 | 1 TB | 800 GB | Thin Provisioning Pool | Normal |
| ⋮ | ⋮ | ⋮ | ⋮ | ⋮ | ⋮ |

Columns: 41330, 41331, 41332, 41333, 41334, 41335

FIG. 9

| Storage ID | Physical Resource ID | Pool ID | Capacity | Media Type | Number of Disk Rotations | State |
|---|---|---|---|---|---|---|
| ST.1 | Drive.1 | Pool.1 | null | null | null | null |
| ST.1 | Drive.2 | Pool.1 | null | null | null | null |
| : | : | : | : | : | : | : |
| ST.2 | Drive.1 | Pool.1 | 500 GB | SATA | 12000 rpm | Normal |
| ST.2 | Drive.2 | Pool.1 | 500 GB | SATA | 12000 rpm | Normal |
| ST.2 | Drive.3 | Pool.1 | 500 GB | SATA | 12000 rpm | Normal |
| ST.2 | Drive.4 | Pool.1 | 500 GB | SATA | 12000 rpm | Normal |
| ST.2 | Drive.5 | Pool.1 | 500 GB | SATA | 12000 rpm | Error |
| ST.2 | Drive.6 | Pool.2 | 500 GB | SSD | n/a | Normal |
| ST.2 | Drive.7 | Pool.2 | 500 GB | SSD | n/a | Normal |
| : | : | : | : | : | : | : |

| Host ID | IP Address | Host Name | Host Type | State |
|---|---|---|---|---|
| Host.1 | 192.168.0.11 | null | null | null |
| Host.2 | 192.168.0.12 | null | null | null |
| Host.3 | 192.168.0.13 | cluster-1 | Cluster | Normal |
| Host.4 | 192.168.0.14 | node-1 | Node | Normal |
| Host.5 | 192.168.0.15 | node-2 | Node | Normal |
| Host.6 | 192.168.0.16 | physical-1 | Physical Server | Error |
| Host.7 | 192.168.0.17 | hypervisor-1 | Hypervisor | Normal |
| Host.8 | 192.168.0.18 | hypervisor-2 | Hypervisor | Normal |
| Host.9 | 192.168.0.19 | vm-1 | Virtual Server | Normal |
| Host.10 | 192.168.0.20 | vm-2 | Virtual Server | Error |
| : | : | : | : | : |

| Host ID | Related Host ID | Relationship Type |
|---|---|---|
| Host.3 | Host.4 | Clusters (Master/Slave) |
| Host.3 | Host.5 | Clusters (Master/Slave) |
| Host.4 | Host.5 | Cluster Nodes |
| Host.7 | Host.8 | Volume-Shared Hypervisors |
| Host.7 | Host.9 | Hypervisor and Virtual Server |
| Host.8 | Host.10 | Hypervisor and Virtual Server |
| : | : | : |

| Host ID | Storage ID | Volume ID |
|---|---|---|
| Host.4 | ST.1 | LU.1 |
| Host.4 | ST.1 | LU.2 |
| Host.5 | ST.1 | LU.1 |
| Host.5 | ST.1 | LU.2 |
| Host.6 | ST.1 | LU.3 |
| Host.7 | ST.2 | LU.1 |
| Host.8 | ST.2 | LU.1 |
| ⋮ | ⋮ | ⋮ |

| Condition ID | Information Acquisition Condition | Information Acquisition Method | Priority Order |
|---|---|---|---|
| 1 | Storage with crucial failure within 24 hours | Hold detailed information of only resource with failure and related resource of the resource. | 5 |
| 2 | Storage scheduled to execute management task within one hour | Hold detailed information of resource related to management task. | 3 |
| 3 | Storage with high frequency of management operation (10 times/hour) | Always hold detailed information of all resources included in the storage. | 4 |
| 4 | Storage with 5000 or fewer volumes | Always hold detailed information of all resources included in the storage. | 1 |
| 5 | Storage more than 10 years after implementation | Always hold only basic information. Acquire detailed information as necessary. | 2 |

| Task ID | Execution Date/Time | Target | Task |
|---|---|---|---|
| 1 | 2010/11/21 0:00 | ST.1:Pool.1 | Create logical volume (capacity: 10 GB) |
| 2 | 2010/11/21 3:00 | ST.1:LU.100 | Allocate logical volume to host (target host: Host.100) |
| 3 | 2010/11/22 13:00 | ST.2:Pool.5 | Create logical volume (capacity: 20 GB) |
| 4 | 2010/11/22 14:00 | ST.2:LU.30 | Create copy of logical volume (copy destination: ST.1:LU.50) |

Logical Volume Information 〜41111

| Storage Subsystem ID | Volume ID | Capacity | RAID Level | Media Type |
|---|---|---|---|---|
| ST.1 | LU.1 | 1 TB | RAID 5 | SSD |

Cut-Out Source Pool Information 〜41112

| Pool ID | Capacity | Free Capacity | Pool Type |
|---|---|---|---|
| Pool.1 | 10 TB | 9 TB | RAID Group |

Allocated Host Information 〜41113

| Host ID | Host IP Address | Host Name | Host Type |
|---|---|---|---|
| Host.4 | 192.168.0.14 | node-1 | Node |
| Host.5 | 192.168.0.15 | node-2 | Node |

| LUN | Segment ID | Volume LBA Area | Storage ID | Resource ID | LBA Area |
|---|---|---|---|---|---|
| 1 | 0 | 0-999 | ST.1 | Drive.1 | 0-999 |
| 1 | 1 | 1000-1999 | ST.1 | Drive.1 | 1000-1999 |
| 3 | 0 | 0-999 | ST.1 | Drive.2 | 0-999 |
| 3 | 1 | 1000-1999 | ST.2 | LU.100 | 0-999 |
| 3 | 2 | 2000-2999 | — | — | — |
| ⋮ | ⋮ | ⋮ | ⋮ | ⋮ | ⋮ |

FIG. 27

| Copy Source Storage ID | Copy Source LUN | Copy Destination Storage ID | Copy Destination LUN | Copy Type |
|---|---|---|---|---|
| ST.1 | 10 | ST.1 | 11 | Mirror |
| ST.1 | 100 | ST.2 | 200 | Mirror |
| ST.1 | 101 | ST.2 | 201 | Clone |
| ⋮ | ⋮ | ⋮ | ⋮ | ⋮ |

| Condition ID | Information Acquisition Condition | Acquisition Method of Configuration Information | Priority Order |
|---|---|---|---|
| 1 | Storage in which one or more volumes are directly allocated to arbitrary host computer | Always hold detailed information of all resources included in the storage. | 3 |
| 2 | Storage with crucial failure within 24 hours | Hold detailed information of only resource with failure and related resource of the resource (if there is configuration of remote copy, storage virtualization, and the like, resource of related storage is also targeted). | 6 |
| 3 | Storage scheduled to execute management task within one hour | Hold detailed information of resource related to management task (if there is configuration of remote copy, storage virtualization, and the like, resource of related storage is also targeted). | 4 |
| 4 | Storage with high frequency of management operation (10 times/hour) | Always hold detailed information of all resources included in the storage. | 5 |
| 5 | Storage with 5000 or fewer volumes | Always hold detailed information of all resources included in the storage. | 1 |
| 6 | Storage more than 10 years after implementation | Always hold only basic information. Acquire detailed information as necessary. | 2 |

41500b  41501b  41502b  41503b

| Configuration Element ID | Information Last Update Date/Time |
|---|---|
| ST.1 | 2010/11/20 15:30:00 |
| ST.2 | 2010/11/19 23:00:00 |
| ST.1:LU.1 | 2010/11/20 15:30:00 |
| ST.1:LU.2 | 2010/11/20 16:00:00 |
| ⋮ | ⋮ |

FIG. 32

| Condition ID | Information Acquisition Condition | Information Acquisition Method | Priority Order | Information Holding Policy ID |
|---|---|---|---|---|
| 1 | Storage with crucial failure within 24 hours | Hold detailed information of only resource with failure and related resource of the resource. | 5 | 1 |
| 2 | Storage scheduled to execute management task within one hour | Hold detailed information of resource related to management task. | 3 | 2 |
| 3 | Storage with high frequency of management operation (10 times/hour) | Always hold detailed information of all resources included in the storage. | 4 | 3 |
| 4 | Storage with 5000 or fewer volumes | Always hold detailed information of all resources included in the storage. | 1 | 4 |
| 5 | Storage more than 10 years after implementation | Always hold only basic information. Acquire detailed information as necessary. | 2 | 5 |

FIG. 33

| Policy ID | Periodic Update Interval of Condition Corresponding Information | Storage Location of Condition Corresponding Information | Discard Timing of Condition Corresponding Information | Storage Location of Condition Non-Corresponding Information | Discard Timing of Condition Non-Corresponding Information |
|---|---|---|---|---|---|
| 1 | 1 Hour | Secondary Storage Device | At Failure Recovery | Memory | After Display of Information |
| 2 | None (No Periodical Update) | Memory | After Display of Result of Management Task | Memory | After Display of Information |
| 3 | 10 Hours | Secondary Storage Device | When Target Storage Is Removed from under Management | Memory | After Display of Information |
| 4 | 1 Day | Secondary Storage Device | When Target Storage Is Removed from under Management | Secondary Storage Device | When Information Is Not Referenced for More than 7 days |
| 5 | 7 Days | Secondary Storage Device | When Target Storage Is Removed from under Management | Memory | After Display of Information |

COMPUTER SYSTEM, MANAGEMENT METHOD OF THE COMPUTER SYSTEM, AND PROGRAM

CROSS-REFERENCE TO RELATED PATENT APPLICATIONS

Japan Priority Application 2011-014257, filed Jan. 26, 2011, including the specification, drawings, claims and abstract, is incorporated herein by reference in its entirety. This application is a Continuation of U.S. application Ser. No. 13/130,001 (National Stage of PCT/JP2011/053322), filed May 18, 2011, incorporated herein by reference in its entirety.

TECHNICAL FIELD

The present invention relates to a computer system, a management method of the computer system, and a program, and for example, to configuration management of a management target in a computer system.

BACKGROUND ART

In recent years, an amount of data used by companies and individuals is rapidly increasing. Therefore, a storage system that connects storage devices (hereinafter, also described as storage subsystems) and host computers through switches and hubs and that uses a technique, such as SAN (Storage Area Network) or NAS (Network Attached Storage), capable of flexible data management is widely used.

Furthermore, in recent years, reduction in the operation cost of the storage system (also referred to as a computer system) is an important issue along with the complication of the storage system. An example of a method for solving the issue includes a method of comprehensively managing the configuration of the storage system, such as the storage subsystems, the host computers, the switches, and the hubs, by management software. An example of such a method includes a method disclosed in Patent Literature 1. The manager of the storage system can use the technique to perform a management operation, such as referring to the linkage of storage resources from a plurality of storage subsystems to a plurality of host computers or allocating a new resource from a storage subsystem to a host computer, based on a single piece of management software. According to the technique, the manager can also comprehensively manage the storage system including the storage subsystems, the host computers, the switches, the hubs, and the like, based on a single piece of management software.

CITATION LIST

Patent Literature

Patent Literature 1: JP Patent Publication (Kokai) No. 2002-63063A
Patent Literature 2: JP Patent Publication (Kokai) No. 2004-5370A
Patent Literature 3: JP Patent Publication (Kokai) No. 2005-250925A

SUMMARY OF INVENTION

Technical Problem

Meanwhile, the number of the storage subsystems, the host computers, and the like arranged in a data center of a company or the like is increasing in recent years, and the storage system is enlarged.

However, the management software always holds all configuration information of the storage system in the methods of the conventional techniques represented by Patent Literature 1. Therefore, there is a problem that not all storage subsystems and host computers in the data center can be managed by a single piece of management software due to a lack of resources, such as a memory included in a management computer. Furthermore, even if the management is possible, there is a problem that the processing time of the management software is long when a management operation is performed, and the efficiency of the management is reduced.

The present invention has been made in view of the circumstances, and the present invention provides a technique capable of efficient comprehensive management of a system, even if the system is a large-scale storage system.

Solution to Problem

To solve the problems, management software in the present invention acquires configuration information of a storage system (computer system) in two stages. In a first stage, the management software acquires only basic information of resources (including only fixed information in which values do not change during system operation unless the resources are added or changed, such as identifiers of resources, the number of resources, and relationship between the resources) included in storage subsystems, host computers, switches, hubs, and the like. The management software determines a range and timing of acquiring detailed configuration information and necessity of holding the detailed configuration information based on the acquired basic information. In a second stage, the management software acquires the detailed configuration information (including information in which values change during system operation) of an appropriate range at appropriate timing. The management software always holds the basic information, but holds the detailed information only necessary to hold.

More specifically, in the present invention, a management computer acquires constituent element basic configuration information at least including identifiers of constituent elements of storage devices (storage subsystems) and host computers as well as correspondence relationships between the constituent elements. Based on a detailed information acquisition rule indicating acquisition conditions and acquisition methods for acquiring detailed configuration information of the constituent elements that changes as the computer system is operated, the management computer acquires the detailed configuration information corresponding to the constituent element basic configuration information.

The detailed information acquisition rule is constituted by combinations of the plurality of acquisition conditions and the plurality of acquisition methods corresponding to the acquisition conditions. Information of the acquisition methods includes information related to a range and timing of acquiring the detailed configuration information. In this case, the management computer determines, for each of the plurality of acquisition conditions, whether there is the constituent element satisfying the acquisition condition and acquires the detailed configuration information based on the determination result and the corresponding acquisition method.

Part of further features related to the present invention is specified in the following description, and part of the further features will become apparent from the description or can be learned from the implementation of the present invention. Modes of the present invention are attained and realized by elements and combinations of various elements as well as by the following detailed description and modes of the attached claims.

The foregoing and following description is for typical description, and it needs to be understood that the description does not limit the claims or applications of the present invention in any sense.

Advantageous Effects of Invention

According to the present invention, a system can be efficiently and comprehensively managed even if the system is a large-scale storage system (computer system).

BRIEF DESCRIPTION OF DRAWINGS

FIG. 7 is a diagram showing an example of configuration of a volume information table.

FIG. 8 is a diagram showing an example of configuration of a pool information table.

FIG. 9 is a diagram showing an example of configuration of a physical resource information table.

FIG. 10 is a diagram showing an example of configuration of a host information table.

FIG. 11 is a diagram showing an example of configuration of a host relationship information table.

FIG. 12 is a diagram showing an example of configuration of a volume allocation information table.

FIG. 13 is a diagram showing an example of configuration of an information acquisition condition table.

FIG. 14 is a diagram showing an example of configuration of a management task table.

FIG. 23 is a diagram showing an example of configuration of a user interface (detailed display of logical volume) according to the present invention.

FIG. 27 is a diagram showing an example of configuration of a copy information table according to the second embodiment.

FIG. 28 is a diagram showing an example of configuration of an information acquisition condition table according to the second embodiment.

FIG. 32 is a diagram showing an example of configuration of an information acquisition condition table according to the third embodiment.

FIG. 33 is a diagram showing an example of configuration of an information holding policy table according to the third embodiment.

DESCRIPTION OF EMBODIMENTS

Figure 1:
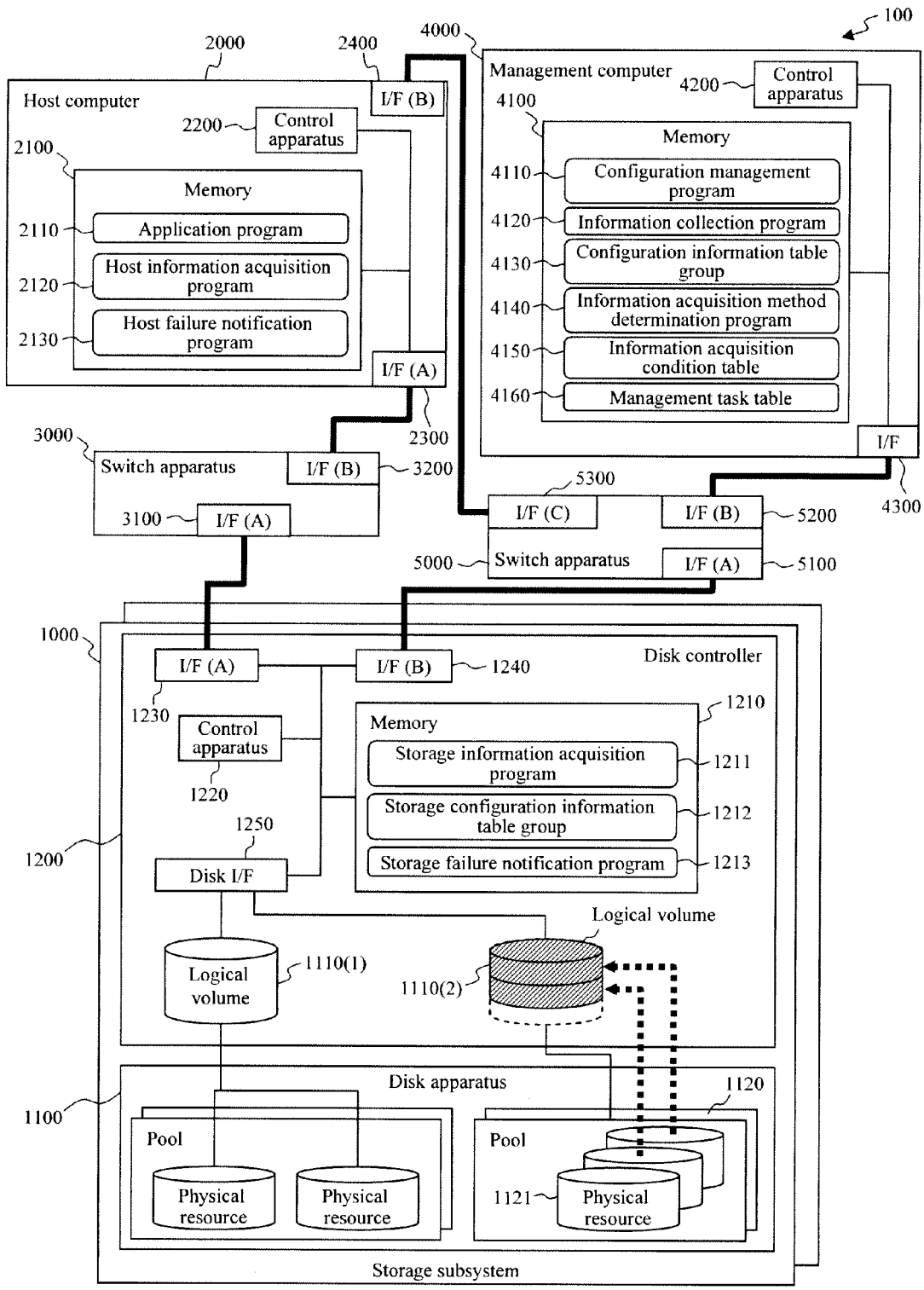
FIG. 1 is a diagram showing a schematic configuration of a computer system (storage system) according to a first embodiment of the present invention.

Hereinafter, embodiments of the present invention will be described with reference to the attached drawings. In the attached drawings, functionally the same elements may be displayed by the same reference numerals. Although the attached drawings illustrate specific embodiments and examples of implementation according to the principle of the present invention, the attached drawings are for the understanding of the present invention and are not used to restrictively interpret the present invention.

Although the present embodiments describe the present invention in detail enough for those skilled in the art to carry out the present invention, other implementations and modes are also possible, and it needs to be understood that changes in configurations and structures as well as replacements of various elements are possible without departing from the range and the spirit of the technical concept of the present invention. Therefore, the following description should not be interpreted restrictively.

Furthermore, as described below, the embodiments of the present invention may be implemented by software operated on a general-purpose computer, or may be implemented by dedicated hardware or a combination of software and hardware.

In an embodiment of the present invention, management software holds conditions (hereinafter, described as information acquisition conditions) for determining a range and timing of acquiring detailed information in configuration information of a storage system and controls acquisition of configuration information of the storage system based on the conditions. The management software may hold the information acquisition conditions as data, or the information acquisition conditions may be implemented as logic in a program. The user of the management software may input the information acquisition conditions.

Examples of the information acquisition conditions include a condition, in which the management software always holds detailed information of a storage subsystem for which the user frequently executes a management operation, and a condition, in which the management software holds detailed information of only a resource with a failure and a resource related to the resource for a storage subsystem with a crucial failure within 24 hours.

Although information of the present invention will be described in "table" formats in the following description, the information do not have to be expressed by data structures based on tables, and the information may be expressed by data structures, such as a list, a DB, and a queue, or by other ways. Therefore, the "table," the "list," the "DB," the "queue," and the like may be simply called "information" to indicate independence from the data structure.

Expressions, such as "identification information," "identifier," "name," "appellation," and "ID," can be used to describe the content of the information, and the expressions can replace each other.

Although a "program" serves as a subject (operational entity) to describe processes in the embodiments of the present invention, the program is executed by a processor to execute a predetermined process while using a memory and a communication port (communication control apparatus). Therefore, the processor may serve as a subject in the description. A process disclosed with the program serving as the subject may be a process executed by a computer or information processing apparatus such as a management server. Part or the entire program may be realized by dedicated hardware or may be modularized. Various programs may be installed on computers through a program distribution server or storage media.

A. First Embodiment

Configuration of Computer System

FIG. 1 is a diagram showing a schematic configuration of a computer system according to a first embodiment of the present invention. A computer system 100 includes storage subsystems 1000, a host computer 2000, a switch apparatus 3000, a management computer 4000, and a switch apparatus 5000. In FIG. 1, there are two storage subsystems 1000, one host computer 2000, one switch apparatus 3000, one management computer 4000, and one switch apparatus 5000. However, the arrangement is not limited to this as long as there is one or more of each component.

A network connection is formed between the storage subsystems 1000 and the host computer 2000 through the switch apparatus 3000. A network connection is formed between the storage subsystems 1000, the host computer 2000, and the management computer 4000 through the switch apparatus 5000. The switch apparatus 3000 and the switch apparatus 5000 may be the same apparatuses. The switch apparatus 5000 may be divided into an apparatus that connects the storage subsystems 1000 and the management computer 4000 and an apparatus that connects the host computer 2000 and the management computer 4000.

The switch apparatus 5000 includes an I/F(A) 5100 for connection with the storage subsystems 1000, an I/F(B) 5200 for connection with the management computer 4000, and an I/F(C) 5300 for connection with the host computer 2000. An example of a network protocol used between the storage subsystems 1000, the management computer 4000, the host computer 2000, and the switch apparatus 5000 that connects the subsystems and the computers includes, but not limited to, TCP/IP. In FIG. 1, there are one I/F(A) 5100, one I/F(B) 5200, and one I/F(C) 5300. However, the arrangement is not limited to this as long as there is one or more of each component.

Although FIG. 1 illustrates the management computer 4000 and the storage subsystems 1000 as different apparatuses, the arrangement is not limited to this. The management computer 4000 may be in the same enclosure as the storage subsystems 1000.

(i) Storage Subsystem

The storage subsystem 1000 includes a disk apparatus 1100 and a disk controller 1200.

The disk apparatus 1100 includes physical resources 1121 and pools 1120. The physical resources 1121 denote resources of storage regions provided by a physical device, such as an HDD (Hard Disk Drive) or an SSD (Solid State Drive). However, the type of the physical device that provides the physical resources 1121 is not particularly limited. The pools 1120 are groups of the physical resources 1121. In general, a technique called RAID (Redundant Array of Independent Disks) is used to make the physical resources 1121 redundant to form the pools 1120. However, the arrangement is not limited to this as long as there are one or more groups of the physical resources 1121. In FIG. 1, there are four pools 1120 and five physical resources 1121. However, the arrangement is not limited to this as long as there is one or more of each. For example, the pools 1120 connected to a logical volume 1110(1) are constituted by the RAID, and the pools 1120 connected to a logical volume 1110(2) are configured to provide a virtual volume based on a Thin Provisioning technique. However, the arrangement is not limited to this. Both may be constituted by the RAID, or both may be configured to provide virtual volumes.

The disk controller 1200 includes a memory 1210, a control apparatus (also referred to as a processor) 1220, an I/F (Interface) 1230 for connection with the switch apparatus 3000, an I/F(B) 1240 for connection with the switch apparatus 5000, and a disk I/F 1250 for connection with the disk apparatus. These constituent elements are connected through a bus.

The disk controller 1200 further includes logical volumes 1110. The logical volumes 1110 denote logical storage regions constituted by one or more physical resources and provided to the host computer 2000 by the disk controller 1200. A logical volume 1110(1) is constituted by one or a plurality of physical resources 1121 allocated in advance, and the capacity of the logical volume 1110(1) and the total capacity of the physical resources 1121 constituting the logical volume 1110(1) are equal. However, if the physical resources are made redundant by the RAID, the capacity of the logical volume 1110(1) may be smaller than the total capacity of the physical resources 1121 constituting the logical volume 1110(1). Meanwhile, a logical volume 1110(2) is a virtual logical volume provided to the host computer 2000, and the physical resources 1121 are allocated in response to a writing request from the host computer 2000. Specifically, when a writing request of data to the logical volume 1110(2) is received, the disk controller 1200 allocates storage regions of the physical resources 1121 to the logical volume 1100(2) if physical resources are not allocated to the target area of the writing request and writes the data in the allocated storage regions of the physical resources. This can make the storage capacity of the logical volume 1110(2) provided to the host computer 2000 larger than the total capacity of the physical resources 1121 actually allocated. Although the number of the two types of logical volumes 1110 is one each in FIG. 1, the arrangement is not limited to this. Only one of the two types may exist, or the two types may be mixed, as long as there are one or more logical volumes 1110.

The memory 1210 stores programs and data used by the control apparatus 1220. Particularly, the memory 1210 includes a storage information acquisition program 1211, a storage configuration information table group 1212, and a storage failure notification program 1213.

The storage information acquisition program 1211 is a program for collecting configuration information of the storage subsystems 1000 and transmitting the information to other programs.

The storage configuration information table group 1212 is a set of tables storing the configuration information of the storage subsystems 1000.

The storage failure notification program 1213 is a program for notifying another program (configuration management program 4110) of information of a failure in the storage subsystems 1000. An example of a type of failure includes, but not limited to, a malfunction of a physical device that provides the physical resources 1121.

The control apparatus 1220 controls execution of programs and input/output of data in the memory 1210 and controls input/output of data and control commands through the I/Fs included in the disk controller 1200.

The storage subsystem 1000 further has general functions of storage devices, such as a function of forming the pools 1120 from the physical resources 1121, a function of generating the logical volumes 1110 from the pools 1120, a function of allocating logical volumes to the host computer 2000 through the I/F(A) 1230, and a function of receiving a request for changing the configuration or setting of the storage subsystem 1000 from the management computer 4000.

The storage subsystem 1000 may further include an input device for the user of the storage subsystem 1000 to input data and an output device for presenting information to the user of the storage subsystem 1000. However, the devices are not directly related to the present invention and are not illustrated.

(ii) Host Computer

The host computer 2000 includes a memory 2100, a control apparatus (also referred to as a processor) 2200, an I/F(A) 2300 for connection with the switch apparatus 3000, and an I/F(B) 2400 for connection with the switch apparatus 5000. The constituent elements are connected through a bus. The memory 2100 stores programs and data used by the control apparatus 2200. Particularly, the memory 2100 includes an application program 2110, a host information acquisition program, and a host failure notification program.

The application program 2110 may be any program.

The host information acquisition program 2120 is a program for collecting configuration information of the host computer 2000 and transmitting the information to another program (configuration management program 4110). The host information acquisition program may be a program different from an OS (Operating System) or may be realized as a function of the OS.

The host failure notification program 2130 is a program for notifying another program (configuration management program 4110) of information of a failure in the host computer 2000. An example of a type of failure includes, but not limited to, a malfunction of the memory 2100.

The control apparatus 2200 controls execution of programs and input/output of data in the memory 2100 and controls input/output of data and control commands through the I/F (A) 2300.

The host computer 2000 may further include an input device (such as a keyboard, a mouse, or other pointing devices and voice input devices) for the user of the host computer 2000 to input data, an output device (such as a display device, a printer, and a voice output device) for presenting information to the user of the host computer 2000, and a secondary storage device for storing data. However, the devices are not directly related to the present invention and are not illustrated.

The switch apparatus 3000 includes an I/F(A) 3100 for connection with the storage subsystems 1000 and an I/F(B) 3200 for connection with the host computer 2000. Examples of a network protocol used between the storage subsystems 1000, the host computer 2000, and the switch apparatus that connects the storage subsystems 1000 and the host computer 2000 include, but not limited to, FC (Fibre Channel) and iSCSI. Although there are one I/F(A) 3100 and one I/F(B) 3200 in FIG. 1, the arrangement is not limited to this as long as there are one or more I/Fs.

(iii) Management Computer

The management computer 4000 includes a memory 4100, a control apparatus (also referred to as a processor) 4200, and an I/F 4300 for connection with the switch apparatus 5000. The memory 4100 stores programs and data used by the control apparatus 4200. For example, the memory 4100 includes the configuration management program 4110, an information collection program 4120, a configuration information table group 4130, an information acquisition method determination program 4140, an information acquisition condition table 4150, and a management task table 4160.

The management computer 4000 may further include an input device for the user of the management computer 4000 to input data, an output device for presenting information to the user of the management computer 4000, and a secondary storage device for storing data. Various tables included in the management computer 4000 may be held not only on the memory but also on the secondary storage device.

The configuration management program 4110 is a program for managing the configurations of the storage subsystems 1000 and the host computer 2000. The configuration management program 4110 has, for example, a function of collecting configuration information of the storage subsystems 1000 and the host computer 2000 through the information collection program 4120 and a function of receiving information related to failures in the storage subsystems 1000 and the host computer 2000 from the storage failure notification program 1213 and the host failure notification program 2130. The configuration management program 4110 further has general functions of a management computer, such as a function of forming the pools 1120 from the physical resources 1121, a function of generating the logical volumes 1110 from the pools 1120, a function allocating the logical volumes 1110 to the host computer 2000 through the I/F(A) 1230, and a scheduler function of executing a specific process at a specific time. The configuration management program 4110 also provides a user interface for displaying the configuration information of the storage subsystems 1000 and the host computer 2000 and performing a management operation for the storage subsystems 1000 and the host computer 2000.

The information collection program 4120 is a program for collecting the configuration information of the storage subsystems 1000 and the host computer 2000. The information collection program 4120 has a function of acquiring the configuration information of the storage subsystems 1000 through communication with the storage information acquisition program 1211 included in the storage subsystems 1000 and a function of acquiring the configuration information of the host computer 2000 through communication with the host information acquisition program 2120 included in the host computer 2000.

The configuration information table group 4130 is a set of tables for storing the configuration information of the storage subsystems 1000 and the host computer 2000.

The information acquisition method determination program 4140 is a program for determining a method of acquiring information when the information collection program 4120 collects information from the storage subsystems 1000 and the host computer 2000. In the present embodiment, the method of acquiring information includes a range of an information acquisition target and timing of acquiring the information.

The information acquisition condition table 4150 is a table indicating conditions and information acquisition methods when the information collection program 4120 collects information from the storage subsystems 1000 and the host computer 2000.

The management task table 4160 is a table for storing information of management tasks executed by the configuration management program 4110.

A serial interface or an Ethernet interface may serve as an input/output device as an alternative to the input device and the display device (output device) included in the management computer 4000. A computer for display including a display, a keyboard, or a pointer device may be connected to the interface to transmit information for display to the computer for display or to receive information for input from the computer for display. In this way, the display or reception of input by the computer for display may replace the input and display by the input/output device.

The memory 1210 of the storage subsystem 1000 may include the programs in the memory 4100 of the management computer 4000, and the control apparatus 1220 may execute the programs to realize the same functions as the management computer 4000. The management computer 4000 may further include programs for managing the switch apparatus 3000 and the switch apparatus 5000.

Hereinafter, a set of one or more computers that manage the computer system 100 and that display the information for display of the present invention will be called a management system in some cases. The management computer 4000 serves as the management system when the management computer 4000 displays the information for display, and a combination of the management computer 4000 and the computer for display also serves as the management system. A plurality of computers may realize the same processes as the management computer for fast and highly reliable management processes, and in that case, the plurality of computers (including the computer for display when the computer for display performs the display) serve as the management system.

<Storage Configuration Information Table Group>

Figures 2, 3, 4:
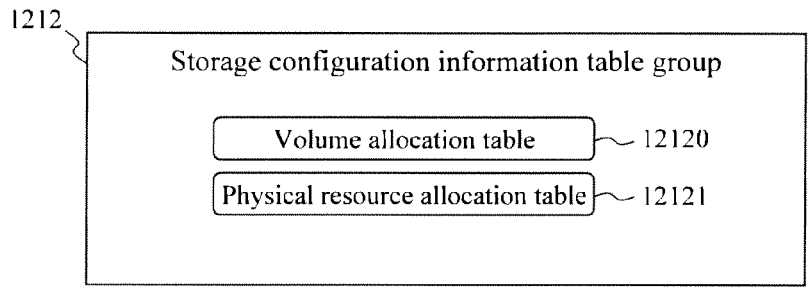
FIG. 2 is a diagram showing an example of configuration of a storage configuration information table group.
FIG. 3 is a diagram showing an example of configuration of a volume allocation table.
FIG. 4 is a diagram showing an example of configuration of a physical resource allocation table.

FIG. 2 is a diagram showing a specific example of the storage configuration information table group 1212 in the storage subsystem. In the present embodiment, the storage configuration information table group 1212 includes a volume allocation table 12120 and a physical resource allocation table 12121.

The volume allocation table 12120 is a table storing information of the logical volumes 1110 allocated to the host computer 2000.

The physical resource allocation table 12121 is a table storing information of physical resource allocation to segments of the logical volumes 1110.

<Example of Configuration of Volume Allocation Table>

FIG. 3 is a diagram showing a specific example of configuration of the volume allocation table 12120. The volume allocation table 12120 includes, as configuration items, an Initiator ID 121200 for identifying the I/F(A) 2300 included in the host computer, a Target ID 121201 for identifying the I/F(A) 1230 included in the storage subsystems 1000, and an LUN (Logical Unit Number) 121202 for identifying the logical volumes 1110.

Although a WWN (World Wide Name) of the I/F(A) 2300 included in the host computer 2000 and a WWN of the I/F(A) 1230 included in the storage subsystems 1000 are used to indicate the Initiator ID 121200 and the Target ID 121201 in FIG. 3, the arrangement is not limited to this as long as the information can uniquely identify the I/F(A) 2300 included in the host computer 2000 and the I/F(A) 1230 included in the storage subsystems 1000. Although the LUN 121202 is used as an identifier of the logical volumes 1110 in FIG. 3, the arrangement is not limited to this as long as the information can uniquely identify the logical volumes 1110.

<Example of Configuration of Physical Resource Allocation Table>

FIG. 4 is a diagram showing an example of configuration of the physical resource allocation table 12121 according to the present embodiment. The physical resource allocation table 12121 includes, as configuration items, an LUN 121210 for identifying the logical volumes 1110, a segment ID 121211 for identifying the segments in the logical volumes, a volume LBA (Logical Block Address) area 121212 for identifying areas of the segments of the logical volumes 1110, a physical resource ID 121213 for identifying the physical resources 1121 allocated to the segments of the logical volumes 1110, and an LBA area 121214 for identifying storage regions of the physical resources 1121 allocated to the segments of the logical volumes 1110.

The LUN 121210, the segment ID 121211, and the physical resource ID 121213 are information that can uniquely identify the logical volumes 1110, the segments in the logical volumes 1110, and the physical resources 1121, respectively. Therefore, the information is not limited to the information described in FIG. 3, and other information may be used.

The volume LBA area 121212 and the LBA area 121214 are not limited to the information described in FIG. 3, and other information may be used as long as the information can uniquely identify the areas of the segments of the logical volumes 1110 and the storage regions in the physical resources 1121.

In FIG. 4, a line with "-" stored in the fields of the physical resource ID 121213 and the LBA area 121214 (line indicated by the LUN 121210 "2" and the segment ID 121211 "2") indicates that there is not yet a writing request from the host computer 2000 to part of the segments of the virtual logical volume 1110(2) provided to the host computer 2000, and therefore, the storage regions of the physical resources 1121 are not yet allocated to the segments.

<CONFIGURATION INFORMATION TABLE GROUP>

Figures 5, 6:
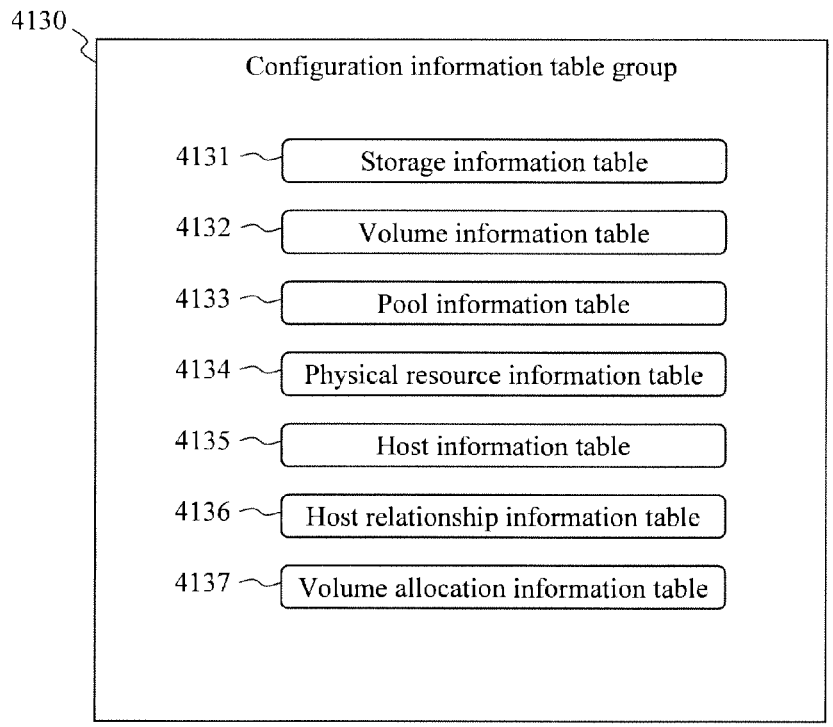
FIG. 5 is a diagram showing an example of configuration of a configuration information table group.
FIG. 6 is a diagram showing an example of configuration of a storage information table.

FIG. 5 is a diagram showing a specific example of the configuration information table group 4130. In the present embodiment, the configuration information table group 4130 includes a storage information table 4131, a volume information table 4132, a pool information table 4133, a physical resource information table 4134, a host information table 4135, a host relationship information table 4136, and a volume allocation information table 4137.

The storage information table 4131 is a table storing information of the storage subsystems 1000.

The volume information table 4132 is a table storing information of the logical volumes 1110 included in the storage subsystems 1000.

The pool information table 4133 is a table storing information of the pools 1120 included in the storage subsystems 1000.

The physical resource information table 4134 is a table storing information of the physical resources 1121 included in the storage subsystems 1000.

The host information table 4135 is a table storing information of the host computer 2000.

The host relationship information table 4136 is a table storing information indicating a relationship between a host computer 2000 and another host computer 2000.

The volume allocation information table 4137 is a table indicating a relationship between the host computer 2000 and the logical volumes 1110 allocated to the host computer 2000.

<Example of Configuration of Storage Information Table>

FIG. 6 is a diagram showing a specific example of configuration of the storage information table 4131. The storage information table 4131 includes, as configuration items, a storage ID 41310 for identifying the storage subsystems 1000, a total capacity 41311 of the pools 1120 included in the storage subsystems 1000, a total free capacity 41312 of the pools 1120 included in the storage subsystems 1000, a total number of volumes 41313 as a total number of the logical volumes 1110 included in the storage subsystems 1000, a last failure date/time 41314 indicating the date/time of the last failures in the storage subsystems 1000, a management operation frequency 41315 indicating the frequency of the management operations executed for the storage subsystems 1000, and an implementation year/month/day 41316 indicating the year/month/day of the implementation of the storage subsystems 1000.

In the storage information table 4131, the storage ID 41310 and the total number of volumes 41313 constitute basic information. The last failure date/time 41314 is information notified from the storage subsystems 1000 or the host computer 2000 upon failure and is not included in the detailed information that the management computer 4000 acquires. The management operation frequency 41315 is not detailed information, but is information indicating the frequency of operations related to the management that are executed for the storage subsystems 1000 by the management software in the past. The implementation year/month/day 41316 is information of the start of operation of the installed storage and is inputted by, for example, the manager (user).

In FIG. 6, "null" is stored in items for which the information is not acquired (for example, the total capacity 41311 of the line with the storage ID "ST.1"). The method indicating that the information is not acquired is not limited to this, and other methods may be used. The information of the storage information table 4131 is not limited to the information shown in FIG. 6, and other information of the storage subsystems 1000 may be stored.

<EXAMPLE OF CONFIGURATION OF VOLUME INFORMATION TABLE>

FIG. 7 is a diagram showing a specific example of configuration of the volume information table 4132. The volume information table 4132 includes, as configuration items, a storage ID 41320 for identifying the storage subsystems 1000, a volume ID 41321 for identifying the logical volumes 1110, a capacity 41322 of the logical volumes 1110, a RAID level 41323 of the logical volumes 1110, a media type 41324 of the physical resources 1121 as providers of the storage regions of the logical volumes 1110, a pool ID 41325 for identifying the pools 1120 as cut-out sources of the logical volumes 1110, and a state 41326 of the logical volumes 1110. In the table, the storage ID 41320, the volume ID 41321, and the pool ID 41325 are basic information acquired first. Meanwhile, the total capacity 41322, the RAID level 41323, the media type 41324, and the state 41326 are detailed information, and "null" is inserted to the fields before the acquisition of the information.

The RAID level 41323 is information indicating the type of a RAID technique applied to the pools 1120 as the cut-out sources of the logical volumes 1110. In other words, the RAID level 41323 is information indicating the degree of redundancy of the logical volumes 1110. The state 41326 is information indicating the operation state of the logical volumes 1110.

In FIG. 7, "null" is stored in the items for which the information is not acquired (such as the capacity 41322 of the line with the storage ID "ST.1" and the volume ID "LU.1"). The method indicating that the information is not acquired is not limited to this, and other methods may be used. In FIG. 7, one of the values "null", "normal", and "error" is stored in the state 41326. However, the values are not limited to these as long as the information indicates the operation state of the logical volumes 1110. The information of the volume information table 4132 is not limited to the information shown in FIG. 7, and other information of the logical volumes 1110 may be stored.

<Example of Configuration of Pool Information Table>

FIG. 8 is a diagram showing a specific example of configuration of the pool information table 4133. The pool information table 4133 includes, as configuration items, a storage ID 41330 for identifying the storage subsystems 1000, a pool ID 41331 for identifying the pools 1120, a capacity 41332 of the pools 1120, a free capacity 41333 of the pools 1120, a pool type 41334 indicating the types of the pools 1120, and a state 41335 of the pools 1120. In the table, the storage ID 41330 and the pool ID 41331 are basic information acquired first. Meanwhile, the total capacity 41332, the free capacity 41333, the pool type 41334, and the state 41335 are detailed information, and "null" is inserted to the fields before the acquisition of the information.

When FIG. 7 is described in related to FIG. 8, since the LU is cut out from the pool, it can be understood that, for example, as for the storage ID 41320 "ST.2" and the volume ID 41321 "LU.1", LU.1 of ST.2 is formed by cutting out the capacity 100 GB from the pool ID 41331 "Pool.1" with the capacity 41332 "2 TB".

In FIG. 8, "null" is stored in the items for which the information is not acquired (such as the capacity 41332 of the line with the storage ID "ST.1" and the pool ID "Pool.1"). The method indicating that the information is not acquired is not limited to this, and other methods may be used. Although one of the values "null", "RAID group", and "Thin Provisioning pool" is stored in the pool type 41334 in FIG. 8, the values are not limited to these as long as the information indicates the types of the pools.

In the present embodiment, the pool 1120 in which the pool type 41334 is "RAID group" indicates a pool that allows allocation of the capacity of one or a plurality of physical resources 1121 in advance to the logical volume 1110(1). The pool 1120 in which the pool type 41334 is "Thin Provisioning pool" indicates a pool that allows allocation of the physical resources 1121 to the logical volume 1110(2) in response to a writing request from the host computer 2000. Although one of the values "null", "normal", and "error" is stored in the state 41335 in FIG. 8, the values are not limited to these as long as the information indicates the operation state of the pools 1120. The information of the pool information table 4133 is not limited to the information shown in FIG. 8, and other information of the pools 1120 may be stored.

<Physical Resource Information Table>

FIG. 9 is a diagram showing a specific example of configuration of the physical resource information table. The physical resource information table 4134 includes, as configuration items, a storage ID 41340 for identifying the storage subsystems 1000, a physical resource ID 41341 for identifying the physical resources 1121, a pool ID 41342 for identifying the pools 1120 to which the physical resources 1121 are allocated, a capacity 41343 of the physical resources 1121, a media type 41344 indicating the types of provider media of the storage regions in the physical resources 1121, the number of disk rotations 41345 of the provider media of the storage regions in the physical resources 1121, and a state 41346 of the physical resources 1121. In the table, the storage ID 41340, the physical resource ID 41341, and the pool ID 41342 are basic information acquired first. Meanwhile, the capacity 41343, the media type 41344, the number of disk rotations 41345, and the state 41346 are detailed information, and "null" is inserted to the fields before the acquisition of the information.

In FIG. 9, "null" is stored in the items for which the information is not acquired (such as the capacity 41343 of the line with the storage ID "ST.1" and the physical resource ID "Drive.1"). The method indicating that the information is not acquired is not limited to this, and other methods may be used. Although one of the values "null", "SATA", and "SSD" is stored in the media type 41344 in FIG. 9, the values are not limited to these as long as the information indicates the types of the media.

In the present embodiment, "n/a" is stored in the number of disk rotations 41345 if the media type 41344 is "SSD". This indicates that the rotation of disk is impossible because there is no disk in the SSD. The method indicating that there is no rotation of disk is not limited to this, and other methods of expression may be used.

Although one of the values "null", "normal", and "error" is stored in the state 41346 in FIG. 9, the values are not limited to these as long as the information indicates the operation state of the physical resources 1121. For example, "error" is inserted when there is a malfunction in the storage subsystems, the storage controller board, or the like. The information of the physical resource information table 4134 is not limited to the information shown in FIG. 9, and other information of the physical resources 1121 may be stored.

<Example of Configuration of Host Information Table>

FIG. 10 is a diagram showing a specific example of configuration of the host information table. The host information table 4135 includes, as configuration items, a host ID 41350 for identifying the host computers 2000, an IP address 41351 allocated to the host computers 2000, a host name 41352 of the host computers 2000, a host type 41353 indicating the types of the host computers 2000, and a state 41354 of the host computers 2000. In the table, the host ID 41350 and the IP address 41351 are basic information acquired first. Meanwhile, the host name 41352, the host type 41353, and the state 41354 are detailed information, and "null" is inserted to the fields before the acquisition of the information.

In FIG. 10, "null" is stored in the items for which the information is not acquired (such as the host name 41352 of the line with the host ID "Host.1"). The method indicating that the information is not acquired is not limited to this, and other methods may be used. Although IP addresses of the host computers 2000 are stored in the host information table 4135 in the present information, the information is not limited to this as long as the information indicates network addresses of the host computers 2000.

In FIG. 10, one of the values "null", "cluster", "node", "physical server", "hypervisor", and "virtual server" is stored in the host type 41353. However, the values are not limited to these as long as the information indicates the types of the host computers 2000. The cluster denotes a logical host computer formed by making a plurality of host computers redundant, and the node denotes a host computer included in the cluster. The hypervisor denotes a host computer including a server virtualization function. The virtual server denotes a virtual host computer constructed on the hypervisor.

Although one of the values "null", "normal", and "error" is stored in the state 41354 in FIG. 10, the values are not limited to these as long as the information indicates the operation state of the host computers 2000. The information of the host information table 4135 is not limited to the information shown in FIG. 10, and other information of the host computers 2000 may be stored.

<Example of Configuration of Host Relationship Information Table>

FIG. 11 is information indicating a specific example of configuration of the host relationship information table 4136. The host relationship information table 4136 includes, as configuration items, a host ID 41360 for identifying the host computers 2000, a related host ID 41361 for identifying other host computers 2000 related to the host computers 2000, and a relationship type 41362 indicating types of relationships between the host computers 2000 and the other host computers 2000. In the table, all configuration items are basic information.

In FIG. 11, one of the values "clusters (master/slave)", "cluster nodes", "volume-shared hypervisors", and "hypervisor and virtual server" is stored in the relationship type 41362. However, the values are not limited to these as long as the information indicates the types of the relationships between the host computers 2000 and the other host computers 2000. The "clusters (master/slave)" denotes a relationship between a cluster and a host computer included in the cluster, and the "cluster nodes" denotes a relationship between the host computers included in the same cluster. The "volume-shared hypervisors" denotes a relationship between hypervisors provided with the same logical volumes 1110 from the storage subsystems 1000 and sharing the volumes. The "hypervisor and virtual server" denotes a relationship between a hypervisor and a virtual server constructed on the hypervisor.

The information of the host relationship information table 4136 is not limited to the information shown in FIG. 11, and other information concerning the relationships between the host computers 2000 and the other host computers 2000 may be stored.

<Example of Configuration of Volume Allocation Information Table>

FIG. 12 is a diagram showing a specific example of configuration of the volume allocation information table 4137. The volume allocation information table 4137 includes, as configuration items, a host ID 41370 for identifying the host computers 2000, a storage ID 41371 for identifying the storage subsystems 1000, and a volume ID 41372 for identifying the logical volumes 1110. In the table, all configuration items are basic information.

The information of the volume allocation information table 4137 is not limited to the information shown in FIG. 12, and other information concerning the relationships between the host computers 2000 and the logical volumes 1110 allocated to the host computers 2000 may be stored.

<Example of Configuration of Information Acquisition Condition Table>

FIG. 13 is a diagram showing a specific example of configuration of the information acquisition condition table 4150. The information acquisition condition table 4150 includes, as configuration items, a condition ID 41500 for identifying information acquisition conditions, an information acquisition condition 41501 indicating conditions for acquiring information, an information acquisition method 41502 indicating methods of acquiring information, and a priority 41503 of the information acquisition conditions.

The condition ID 41500 is identification information for specifying the information acquisition conditions. The information acquisition condition 41501 is information for defining whether the management computer 4000 acquires detailed information when a predetermined condition is satisfied or when a predetermined event is generated. The information acquisition method 41502 is information for defining acquisition methods of the detailed information. The priority order 41503 is information for defining the order of checking, which can be set by the manager.

For example, according to the information acquisition condition 41501 defined as the condition ID=2, it can be understood that if there is a management task to be executed (task defined in FIG. 14), detailed information necessary to execute the management task needs to be acquired.

According to the information acquisition condition 41501 of the condition ID=4, it can be understood that for a storage in which the total number of volumes is 5000 or less, detailed information is acquired when the storage is set. The total number of volumes is determined in consideration of an efficient balance between disadvantages in always (at the same time as the setting) acquiring the detailed information and disadvantages in executing a process of acquiring the detailed information when the detailed information is necessary (for example, when the detailed information needs to be displayed). The value 5000 is merely an illustration, and the manager can freely set the value.

Figure 19:
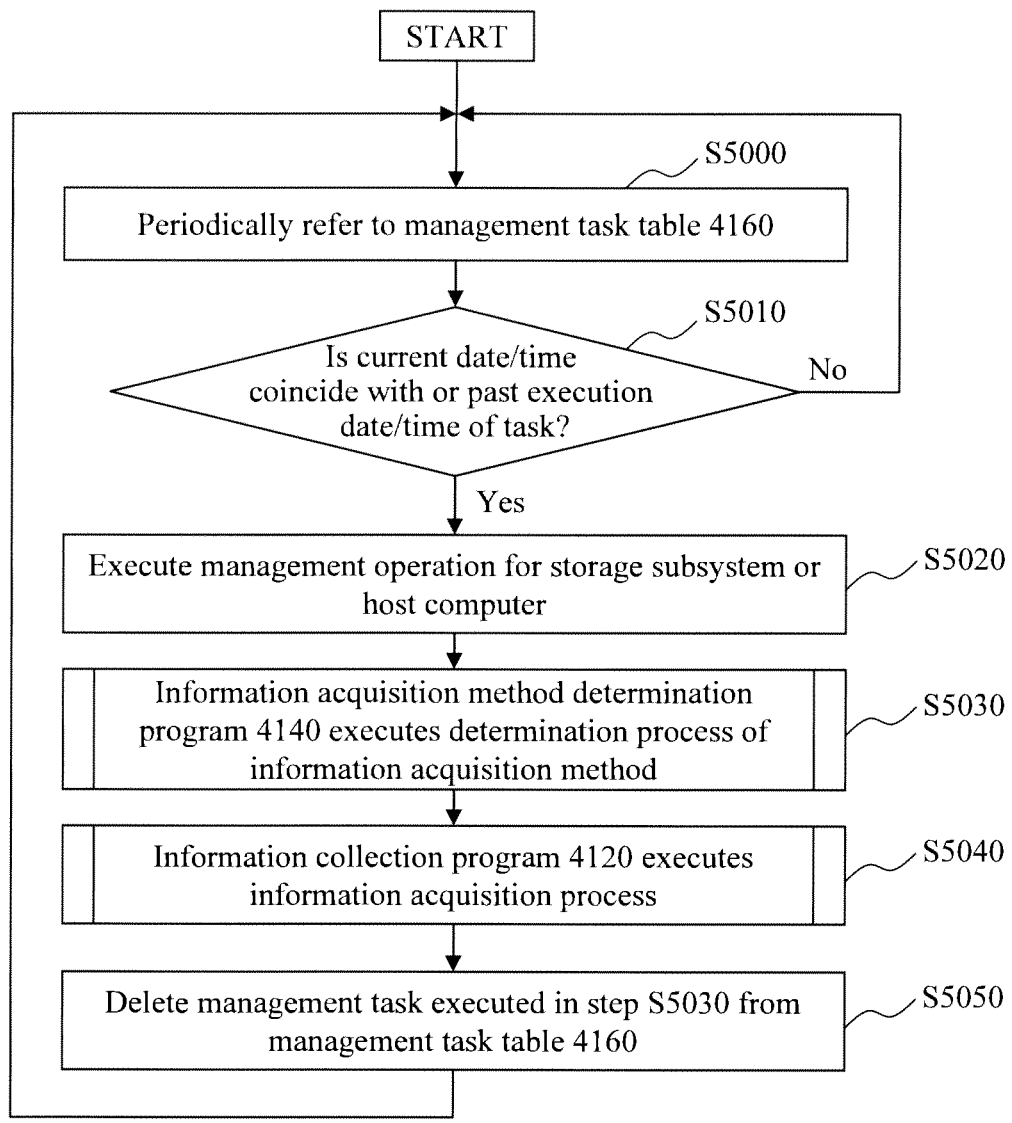
FIG. 19 is a flow chart for explaining a process by the management software executing a management operation for the storage subsystem or the host computer.
Figure 20:
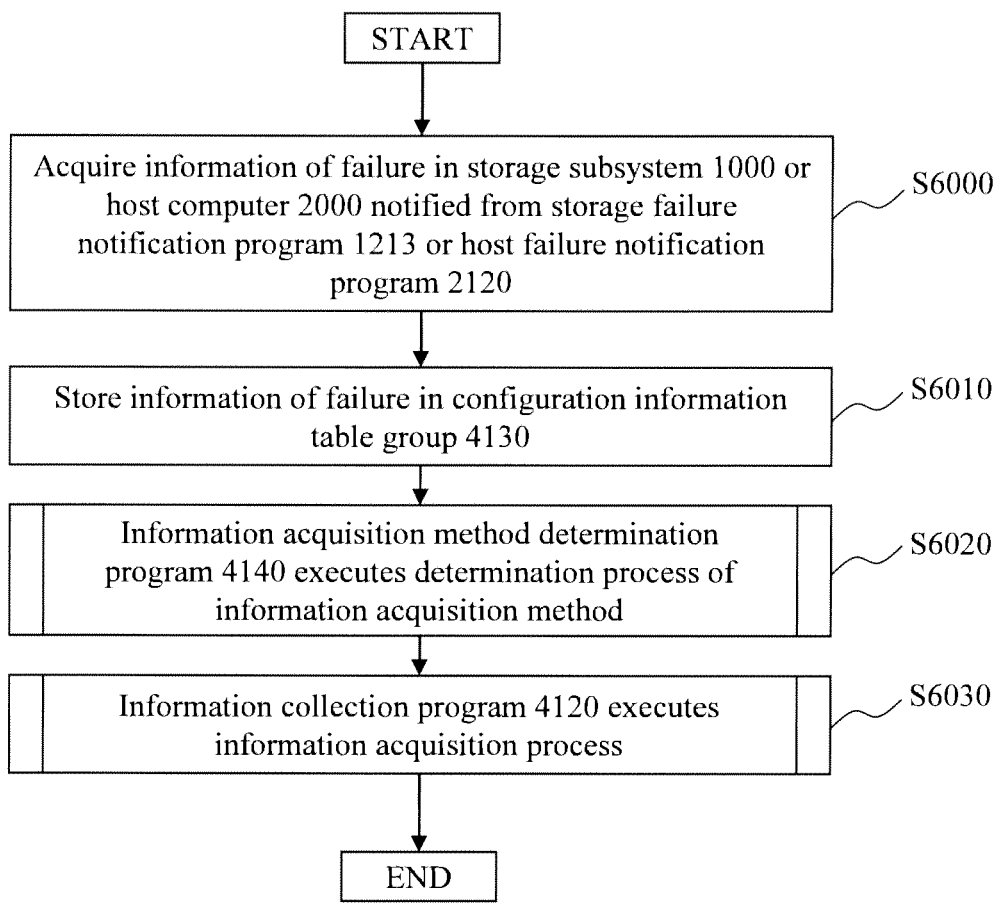
FIG. 20 is a flow chart for explaining a process by the management software receiving information of a failure in the storage subsystem or the host computer.

As described below, the information acquisition condition table 4150 is checked, for example, when a management target is added (see FIG. 15), when the configuration management program 4110 periodically executes a management task for the storage subsystems 1000 or the host computers 2000 (see FIG. 19), and when a notification of a failure is received from the storage subsystems 1000 or the host computers 2000 (FIG. 20).

Although conditions and methods described in a natural language are stored in the information acquisition condition 41501 and the information acquisition method 41502 in FIG. 13, the information is not limited to this as long as the information indicates conditions and methods of acquiring information. The conditions and methods of acquiring information may be predetermined or may be inputted by the user. The conditions and methods of acquiring information are not limited to the ones shown in FIG. 13, and other conditions and methods may be used. In the present embodiment, the information acquisition condition table 4150 stores conditions and information acquisition methods when the information collection program 4120 collects information from the storage subsystems 1000 or the host computers 2000. However, the arrangement is not limited to this, and for example, the same information may be implemented in the information acquisition method determination program 4140 as logic of processing.

<Example of Configuration of Management Task Table>

FIG. 14 is a specific example of configuration of the management task table 4160. The management task table 4160 includes, as configuration items, a task ID 41600 for identifying management tasks, an execution date/time 41601 of the management tasks, a target 41602 indicating execution target resources of the management tasks, and a task 41603 indicating the management tasks. The manager can set the management tasks defined in the management task table.

In FIG. 14, the target 41602 stores values connecting, by a symbol ":", the IDs of resources as execution targets of the management targets. However, the values are not limited to these as long as the information identifies the execution target resources of the management targets. Although management tasks described in a natural language are stored in the task 41603 in FIG. 14, the information is not limited to this as long as the information indicates the management tasks.

The control apparatus 4200 controls execution of the programs in the memory 4100 as well as input/output of data and controls input/output of data as well as control commands through the I/F 4300.

<Management Registration Process>

Figure 15:
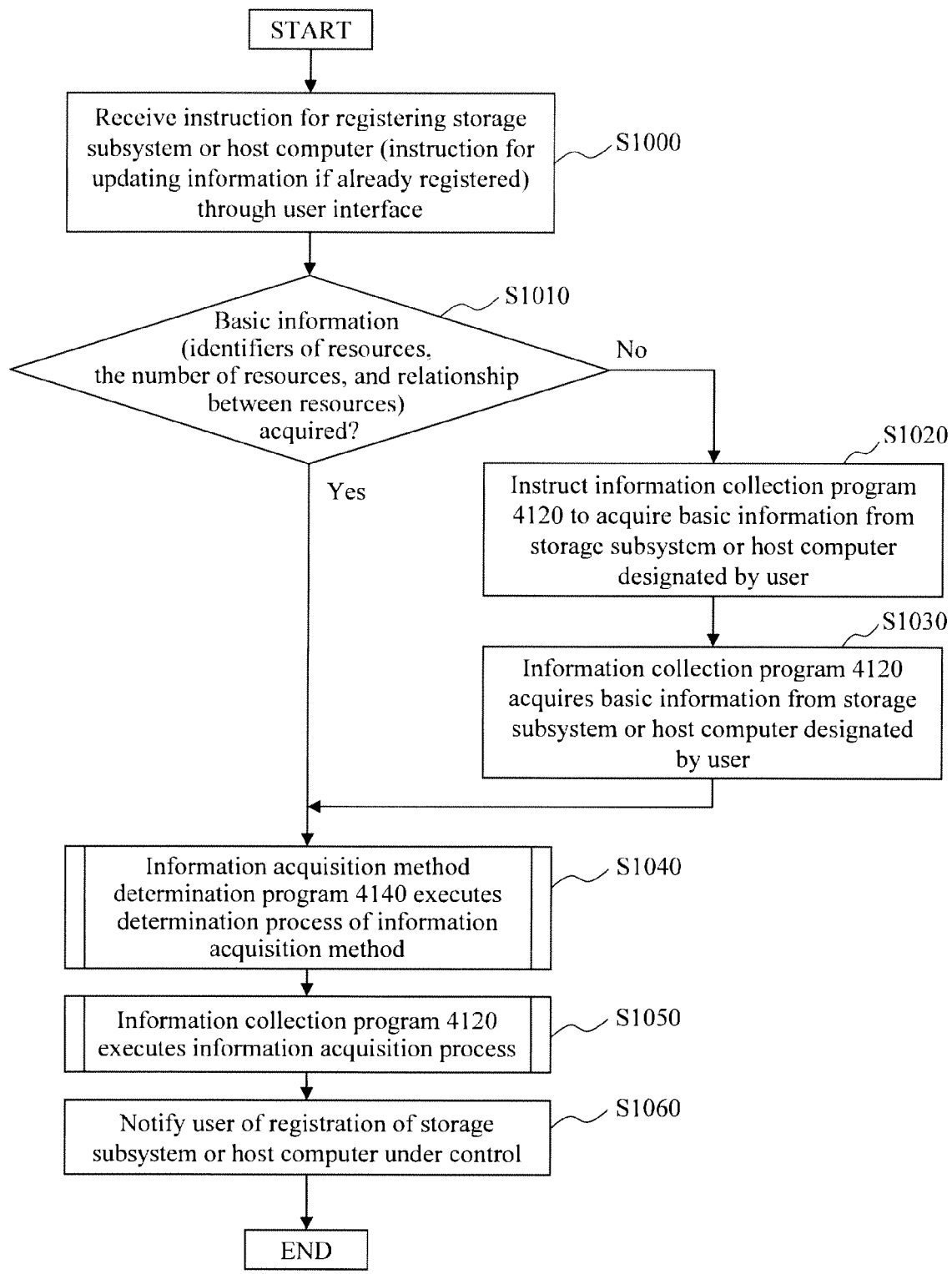
FIG. 15 is a flow chart for explaining a process of registering a storage subsystem or a host computer as a management target of management software.

FIG. 15 is a flow chart for explaining a process when the configuration management program 4110 registers the storage subsystem 1000 or the host computer 2000 as a management target according to the present embodiment.

In step S1000, the manager (user) instructs registration of the storage subsystem 1000 or the host computer 2000 as a management target of the configuration management program 4110 through the user interface of the configuration management program 4110, and the configuration management program receives the instruction. In the present embodiment, if the manager (user) designates the storage subsystem 1000 or the host computer 2000 already registered, it is assumed that the manager has reacquired and updated the configuration information of the storage subsystem 1000 or the host computer 2000 stored in the configuration information table group 4130.

In step S1010, the configuration management program 4110 refers to the configuration information table group 4130 to determine whether the basic information of the storage subsystem 1000 or the host computer 2000 designated by the user is already acquired. In the present embodiment, the basic information denotes the identifiers of the resources, the number of resources, and the relationship between the resources.

If it is determined in step S1010 that the basic information is not acquired (No in step S1010), the process moves to step S1020, and the configuration management program 4110 instructs the information collection program 4120 to acquire the basic information from the storage subsystem 1000 or the host computer 2000 designated by the user in step S1000.

In step S1030, the information collection program 4120 communicates with the storage information acquisition program 1211 on the storage subsystem 1000 or the host information acquisition program 2120 on the host computer 2000 to acquire the basic information of the storage subsystem 1000 or the host computer 2000 and stores the basic information in the configuration information table group 4130. The process moves to step S1040 when the process is completed.

On the other hand, if it is determined in step S1010 that the basic information is acquired (Yes in S1010), the process moves to step S1040.

In step S1040, the configuration management program 4110 instructs the information acquisition method determination program 4140 to execute the determination process of the information acquisition method. The information acquisition method determination program 4140 determines a method (range and timing) of acquiring the detailed information from the storage subsystem 1000 or the host computer 2000 based on the basic information of the storage subsystem 1000 or the host computer 2000 and based on the information stored in the information acquisition condition table 4150. The information acquisition method determination program 4140 notifies the information collection program 4120 of the determined information acquisition method. Details of the information acquisition method determination process by the information acquisition method determination program 4140 will be described later (see FIG. 16).

In step S1050, the configuration management program 4110 instructs the information collection program 4120 to execute an information acquisition process for the storage subsystem 1000 or the host computer 2000 based on the information acquisition method determined by the information acquisition method determination program 4140. Details of the information acquisition process will be described below (see FIG. 17).

Lastly, in step S1060, the configuration management program 4110 notifies the manager of the registration of the storage subsystem 1000 or the host computer 2000 as a management target. Examples of the method of notification include, but not limited to, a method of notification through a user interface, such as GUI (Graphical User Interface) and CLI (Command Line Interface), and a method of outputting a message to the log. In the present embodiment, if the configuration information (even if the information is only the basic information) of the storage subsystem 1000 or the host computer 2000 is stored in the configuration information table group, it is assumed that the storage subsystem 1000 or the host computer 2000 is the management target of the configuration management program 4110.

This completes the process of registering the storage subsystem 1000 or the host computer 2000 as a management target of the configuration management program 4110. The present process may not be executed at the time when the user registers the storage subsystem 1000 or the host computer 2000 as a management target of the configuration management program 4110. More specifically, a technique such as SLP (Service Location Protocol) may be used, and the configuration management program 4110 may detect the existence of the storage subsystem 1000 or the host computer 2000 connected through the switch apparatus 5000 to execute the registration process at the time of the detection.

<Information Acquisition Method Determination Process>

Figure 16:
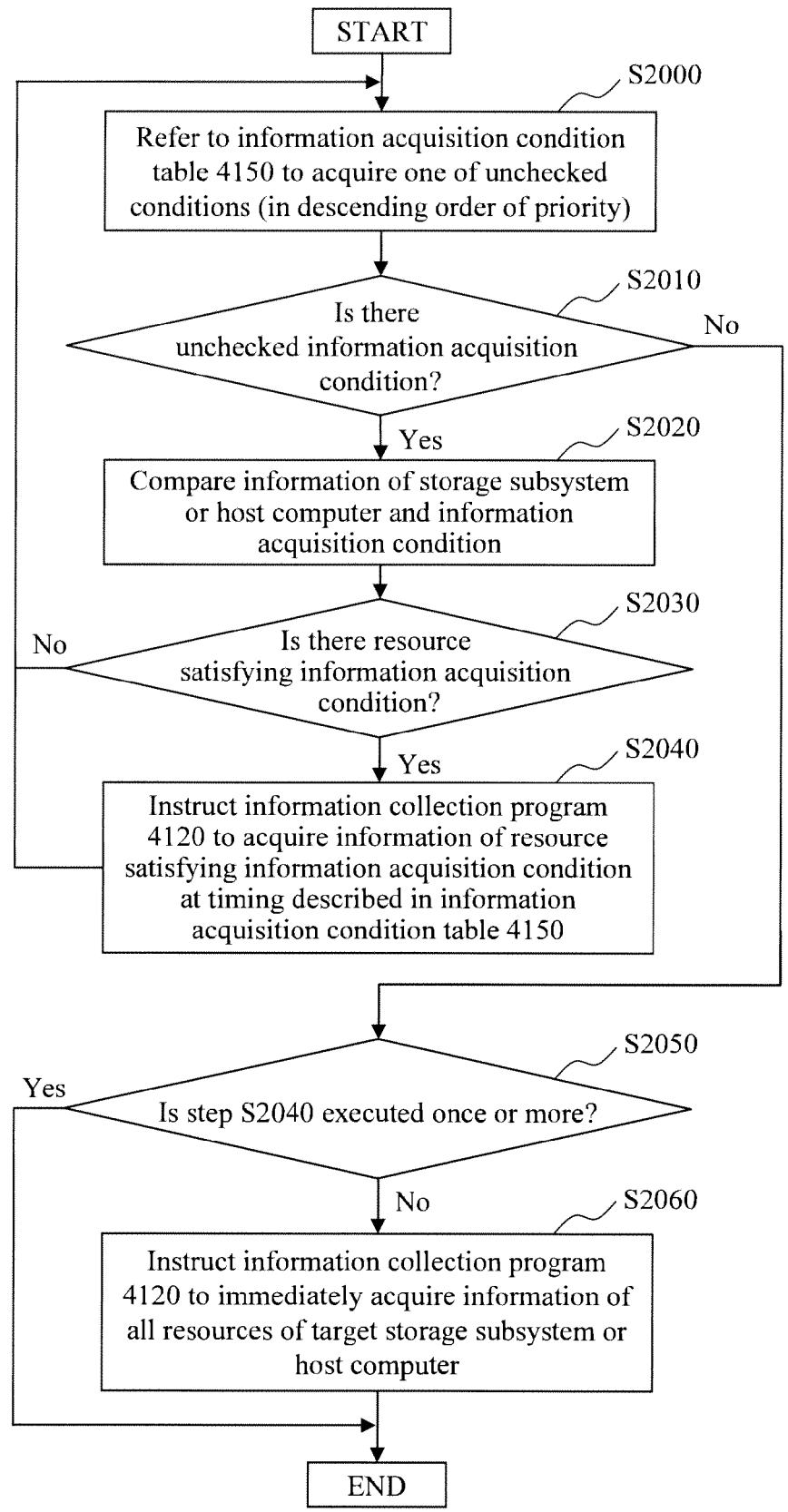
FIG. 16 is a flow chart for explaining a process of determining a range and timing for the management software to acquire information from the storage subsystem or the host computer.

FIG. 16 is a flow chart for explaining a process when the information acquisition method determination program 4140 determines the method (range and timing) of acquiring information from the storage subsystem 1000 or the host computer 2000 according to the present embodiment.

The information acquisition method determination program 4140 refers to the information acquisition condition table 4150 in step S2000 and acquires one condition not checked yet in step S2010. In that case, the conditions are acquired in ascending order of the numbers of the priority order 41503 (in descending order of the priority order) of the information acquisition condition table 4150 in the present embodiment.

In step S2010, the information acquisition method determination program 4140 determines whether there is an unchecked condition.

If there is an unchecked condition (Yes in step S2010), the information acquisition determination program 4140 sets the condition to "checked" and moves the process to step S2020.

In step S2020, the information acquisition method determination program 4140 refers to the configuration information table group 4130 and the information acquisition condition table 4150 to compare the information of the storage subsystem 1000 or the host computer 2000 with the information acquisition condition.

In step S2030, the information acquisition method determination program 4140 determines whether there are resources satisfying the information acquisition condition. In the present embodiment, if the process of FIG. 16 is called out from step S1030 of FIG. 15, the information acquisition method determination program 4140 targets the resources of the storage subsystem 1000 or the host computer 2000 designated by the user in step S1000 of FIG. 15 to determine whether there are the resources. Specifically, for example, if the user has designated one of the storage subsystems 1000 in step S1000 of FIG. 15 and if the number of logical volumes included in the storage subsystem 1000 is 5000 or less, it is determined that the storage subsystem 1000 satisfies the information acquisition condition (the information acquisition condition 41501 of the line in which the condition ID 41500 of the information acquisition condition table 4150 is "4").

If there is no resource satisfying the information acquisition condition (No in step S2030), the process moves to step S2000. On the other hand, if there are resources satisfying the information acquisition condition (Yes in step S2030), the process moves to step S2040.

In step S2040, the information acquisition method determination program 4140 instructs the information collection program 4120 to acquire the information of the resources satisfying the information acquisition condition at the timing described in the information acquisition condition table 4150. Specifically, for example, if the user has designated one of the storage subsystems 1000 in step S1000 of FIG. 15, and if the number of the logical volumes included in the storage subsystem 1000 is 5000 or less, the information acquisition method determination program 4140 instructs the information collection program 4120 to acquire detailed information of all resources included in the storage and to hold the detailed information in the configuration information table group 4130. When the process of step S2040 is completed, the process moves to step S2000.

If it is determined in step S2010 that there is no unchecked information acquisition condition (No in step S2010), the process moves to step S2050.

In step S2050, the information acquisition method determination program 4140 determines whether the process of step S2040 is executed once or more.

If it is determined that the process of step S2040 is executed once or more (Yes in step S2050), the information acquisition method determination program 4140 ends the information acquisition method determination process.

On the other hand, if the process of step S2040 is not executed once or more, in other words, if no condition is stored in the information acquisition condition table 4150 (No in step S2050), the information acquisition method determination program 4140 instructs the information collection program 4120 to immediately acquire the detailed information of all resources of the target storage subsystem 1000 or host computer 2000. This is because the detailed information will not be acquired forever if the process of step S2040 is not executed even once. If not all information acquisition conditions are met, the detailed information of all resources is acquired as in the conventional technique.

This completes the process of determining the range and timing of acquiring information from the storage subsystem 1000 or the host computer 2000.

To promote a better understanding, a specific example will be used to describe the process. First, it is assumed that a failure has occurred in one of the physical resources 1121 included in the storage subsystems 1000 at 3:30:15 of Nov. 19, 2010. It is assumed that the storage failure notification program 1213 transmits failure information concerning the physical resources 1121 of the storage subsystem 1000 to the configuration management program 4110, and the configuration management program 4110 holds the failure information in the physical resource information table 4134. This is equivalent to a line indicated by the storage ID 41340 "ST.2" and the physical resource ID 41341 "Drive.5" (line displayed "error") in FIG. 9. Similarly, it is assumed that date/time of the failure is stored in the last failure date/time 41314 of the storage information table 4131. This is equivalent to a line indicated by the storage ID 41310 "ST.2" in FIG. 6.

If the information acquisition method determination program 4140 is operated at 0:0:0 of Nov. 20, 2010, the information acquisition method determination program 4140 determines that the condition of the line indicated by the condition ID 41500 "1" among the conditions stored in the information acquisition condition table shown in FIG. 13 is met (provided that the other conditions shown in FIG. 13 are not met).

As a result, the information acquisition method determination program 4140 determines to acquire the detailed information of the physical source of the line indicated by the storage ID 41340 "ST.2" and the physical resource ID 41341 "Drive.5" in FIG. 9 and the detailed information of the related resources and to hold the detailed information in the configuration information table group 4130. In this way, since the detailed information of only the related resources is acquired during the failure, the related resources need to be specified from the tables. The related resources in the example include the pool of the line indicated by the storage ID 41330 "ST.2" and the pool ID 41331 "Pool.1" in FIG. 8, the logical volume of the line indicated by the storage ID 41320 "ST.2" and the volume ID 41321 "LU.1" in FIG. 7, the host computers of the lines indicated by the host ID 41370 "Host.7" and "Host.8" in FIG. 12, and the host computers indicated by the related host ID 41361 "Host.9" and "Host.10" in FIG. 11.

<Information Acquisition Process>

Figure 17:
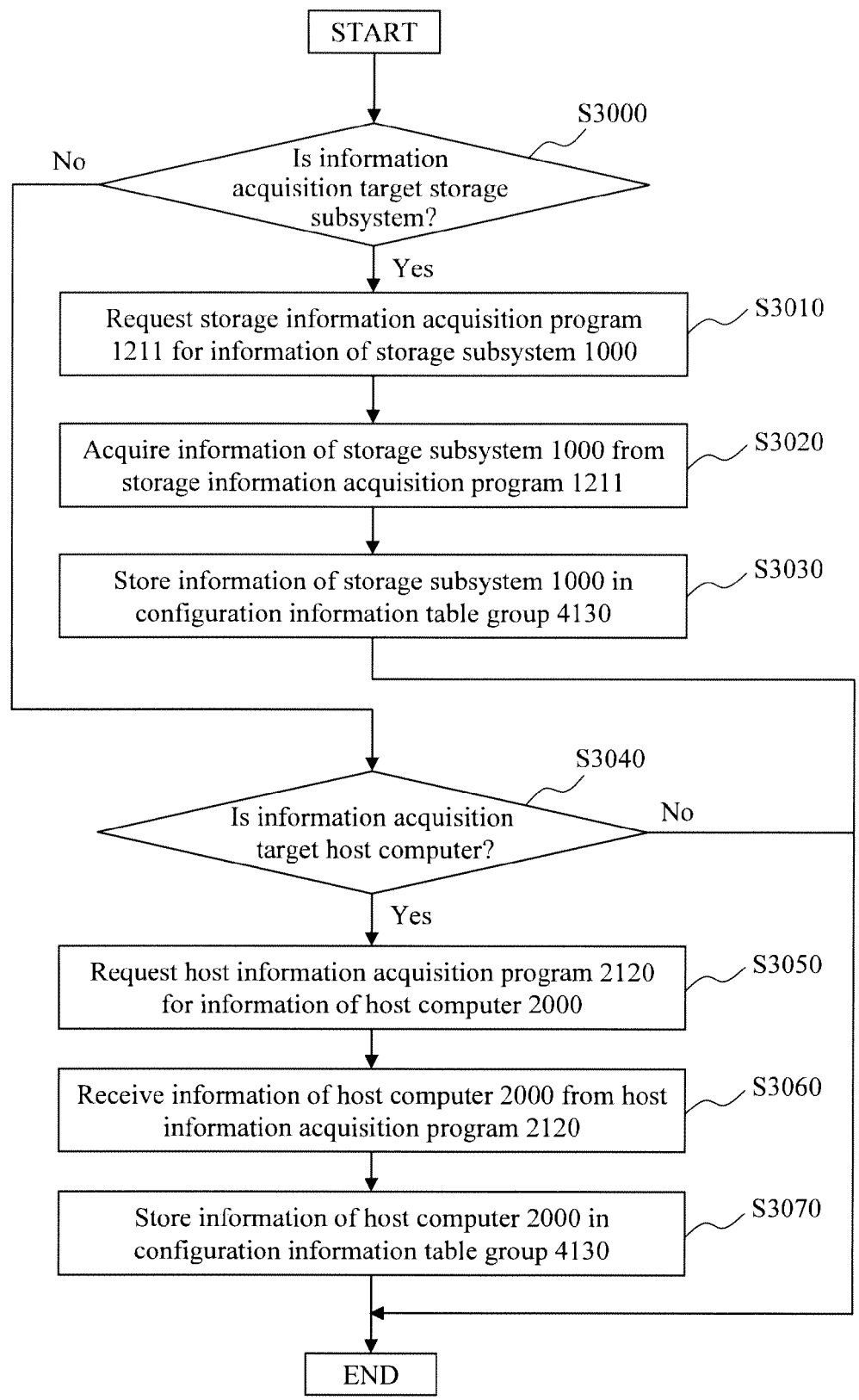
FIG. 17 is a flow chart for explaining a process by the management software acquiring information from the storage subsystem or the host computer.

FIG. 17 is a flow chart for explaining the process when the information collection program 4120 acquires information from the storage subsystem 1000 or the host computer 2000 according to the present embodiment.

In step S3000, the information collection program 4120 determines whether the target of the acquisition of information is the storage subsystem 1000.

If the information acquisition target is not the storage subsystem 1000 (No in step S3000), the process moves to step S3040. If the information acquisition target is the storage subsystem 1000 (Yes in step S3000), the process moves to step S3010.

In step S3010, the information collection program 4120 requests the storage information acquisition program 1211 on the storage subsystem 1000 for the information of the storage subsystem 1000. In this case, the information collection program 4120 requests for the information of the range determined by the information acquisition method determination program 4140 to acquire the detailed information. The information collection program 4120 does not request for the information of the range determined by the information acquisition method determination program 4140 to acquire the detailed information if the timing of acquiring the information (acquisition condition of FIG. 13) is not satisfied at the point of the process.

In step S3020, the information collection program 4120 receives information of the storage subsystem 1000 transmitted from the storage information acquisition program 1211 in response to the request of step S3010.

In step S3030, the information collection program 4120 stores the information of the storage subsystem 1000 in the configuration information table group 4130.

Meanwhile, in step S3040, the information collection program 4120 determines whether the information acquisition target is the host computer 2000.

If the information acquisition target is not the host computer 2000 (No in step S3040), the information collection program 4120 ends the information acquisition process. On the other hand, if the information acquisition target is the host computer 2000 (Yes in step S3040), the process moves to step S3050.

In step S3050, the information collection program 4120 requests the host information acquisition program 2120 for the information of the host computer 2000. In this case, the information collection program 4120 requests for the information of the range determined by the information acquisition method determination program 4140 to acquire the detailed information. The information collection program 4120 does not request for the information of the range determined by the information acquisition method determination program 4140 to acquire the detailed information if the timing of acquiring the information is not satisfied at the point of the process.

In step S3060, the information collection program 4120 receives the information of the host computer 2000 transmitted from the host information acquisition program 2120 in response to the request of step S3050.

In step S3070, the information collection program 4120 stores the information of the host computer 2000 in the configuration information table group 4130.

This completes the process by the information collection program 4120 acquiring the information of the range determined by the information acquisition method determination program 4140 from the storage subsystem 1000 or the host computer 2000 at the timing determined by the information acquisition method determination program 4140.

<Registration Process of Management Task>

Figure 18:
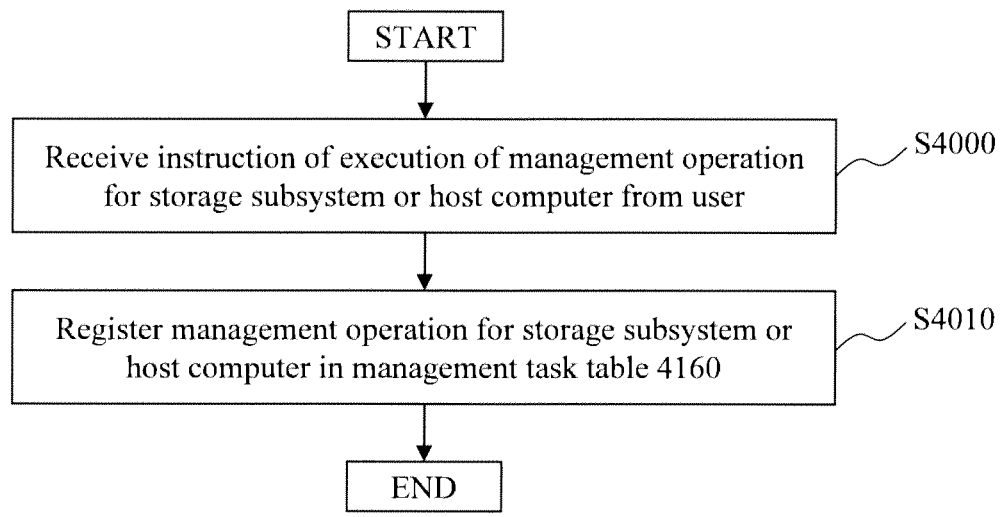
FIG. 18 is a flow chart for explaining a process of registering, in the management software, a management operation for the storage subsystem or the host computer.

FIG. 18 is a flow chart for explaining a process of registering a management operation in the configuration management program 4110 when the manager (user) instructs execution of a management operation for the storage subsystem 1000 or the host computer 2000 through the user interface of the configuration management program 4110.

In step S4000, when the manager instructs the execution of the management operation for the storage subsystem 1000 or the host computer 2000 through the user interface of the configuration management program 4110, the configuration management program 4110 receives the instruction.

In step S4010, the configuration management program 4110 registers the management operation for the storage subsystem 1000 or the host computer 2000 in the management task table 4160.

This completes the process of registering the management operation for the storage subsystem 1000 or the host computer 2000 in the configuration management program 4110. If the user wants to immediately execute the management operation for the storage subsystem 1000 or the host computer 2000, the user can designate the current date/time as the execution date/time of the management task.

<Execution Process of Management Task>

FIG. 19 is a flow chart for explaining a process when the configuration management program 4110 executes a management operation for the storage subsystem 1000 or the host computer 2000 according to the present embodiment. The process of FIG. 19 is executed in a different thread from other processes (such as the processes of FIGS. 15 and 18). Therefore, the process of FIG. 19 is executed in parallel with the other processes.

In step S5000, the configuration management program 4110 periodically refers to the management task table 4160. The time interval of the configuration management program 4110 to referring to the management task table 4160 may be predetermined, or the user may designate the time interval.

In S5010, the configuration management program 4110 compares the current date/time and the execution date/time 41601 of the management task table 4160 to determine whether the current date/time corresponds to the execution date/time 41601 of the management task or whether the current date/time is over the execution date/time 41601. Since the timing of comparison with the task execution date/time set on the table may be deviated in some degree depending on the period (timing) of referencing the management task table, whether the time "is over" is also determined.

If the current date/time does not correspond to the execution date/time 41601 of the management task and if the current date/time is not over the execution date/time 41601 (No in step S5010), the process moves to step S5000. On the other hand, if the current date/time corresponds to the execution date/time 41601 of the management task or if the current date/time is over the execution date/time 41601 (Yes in step S5010), the process moves to step S5020.

In step S5020, the configuration management program 4110 executes the management operation (management task) for the storage subsystem 1000 or the host computer 2000. Examples of the management operation include, but not limited to, an operation of creating the logical volumes 1110 from the pools 1120 and an operation of allocating the logical volumes 1110 to the host computer 2000.

In step S5030, the configuration management program 4110 instructs the information acquisition method determination program 4140 to execute the information acquisition method determination process to reflect, in the configuration information table group 4130, the configuration of the storage subsystem 1000 or the host computer 2000 changed by the management operation executed in step S5020. In response to the instruction, the information acquisition method determination program 4140 executes the information acquisition method determination process. Details of the information acquisition method determination process are as shown in FIG. 16.

In step S5040, the configuration management program 4110 instructs the information collection program 4120 to execute the information collection process, and in response to the instruction, the information collection program 4120 acquires the information of the storage subsystem 1000 or the host computer 2000. Details of the information acquisition process are as shown in FIG. 17.

Lastly, in step S5050, the configuration management program 4110 deletes the management task executed in step S5030 from the management task table 4160. When the deletion is finished, the process moves to step S5000.

This completes the process of executing the management operation (management task) for the storage subsystem 1000 or the host computer 2000 and the process of reflecting, in the configuration information table group 4130, the configuration of the storage subsystem 1000 or the host computer 2000 changed by the management operation. To reflect the configuration information changed by the management operation in the configuration information table group 4130, the information of all resources of the storage subsystem 1000 or the host computer 2000 as the management operation target may not be necessarily acquired again. For example, a condition "detailed information of the resources related to the management operation is acquired and held if the management operation is executed for the storage with 5000 or fewer volumes" can be stored in the information acquisition condition table 4150 to avoid reacquisition of the information of all resources of the storage subsystem 1000 or the host computer 2000.

<Failure Information Reception Process>

FIG. 20 is a flow chart for explaining a process when the configuration management program 4110 receives information of a failure in the storage subsystem 1000 or the host computer 2000 from the storage failure notification program 1213 or the host failure notification program 2130 according to the present embodiment.

In step S6000, the configuration management program 4110 receives information of a failure in the storage subsystem 1000 or the host computer 2000 notified from the storage failure notification program 1213 or the host failure notification program 2130.

In step S6010, the configuration management program 4110 stores the received information of the failure in the configuration information table group 4130.

In step S6020, the configuration management program 4110 instructs the information acquisition method determination program 4140 to execute the information acquisition method determination process, and in response to the instruction, the information acquisition method determination program 4140 executes the information acquisition method determination process. As a result, the range and timing of acquiring the information related to the failure is determined. Details of the information acquisition method determination process are as shown in FIG. 16.

In step S6030, the configuration management program 4110 instructs the information collection program 4120 to execute the information collection process, and the information collection program 4120 executes the information acquisition process to acquire the information of the range determined in step S6020 at the timing determined in step S6020. Details of the information acquisition process are as shown in FIG. 17.

<Information Display Process>

Figure 21:
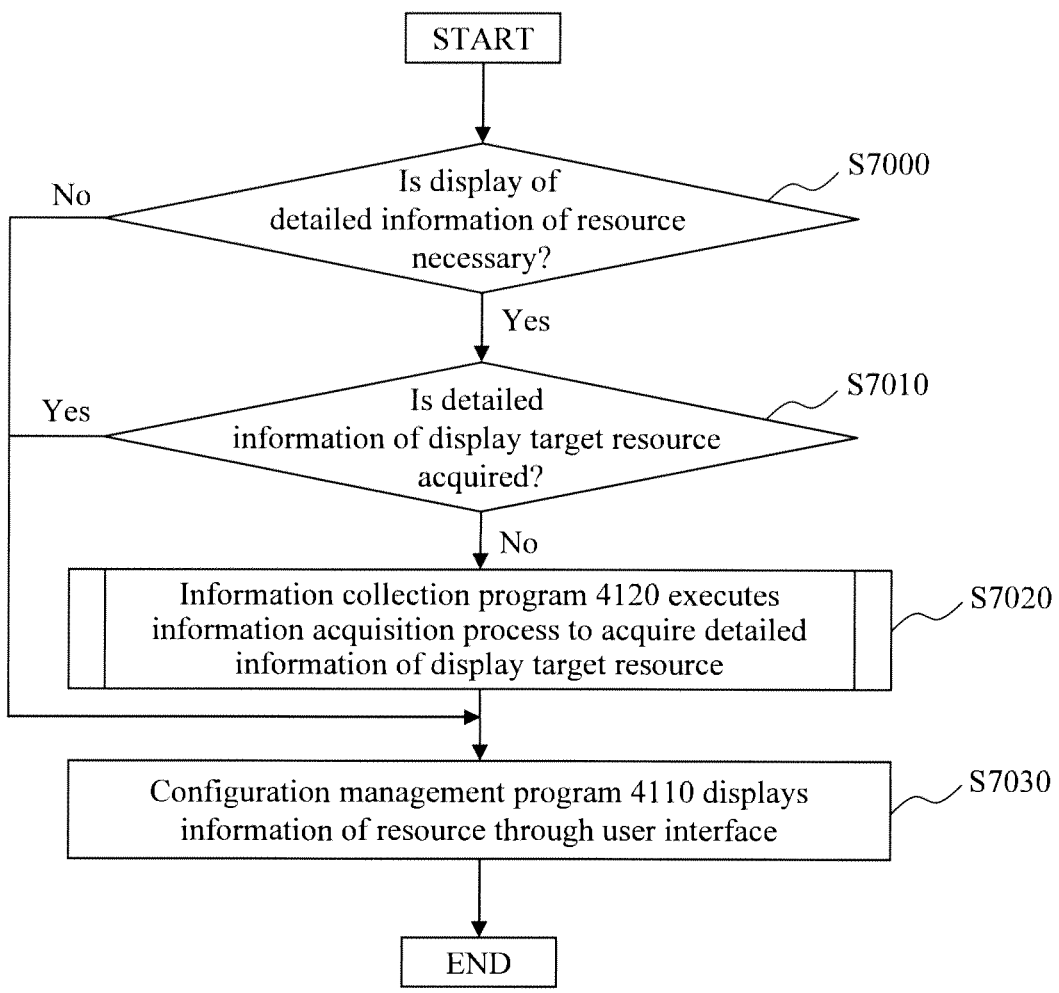
FIG. 21 is a flow chart for explaining a process by the management software displaying information of the storage subsystem or the host computer.

FIG. 21 is a flow chart for explaining a process when the configuration management program 4110 displays the configuration information of the storage subsystem 1000 or the host computer 2000 through the user interface according to the present embodiment.

In step S7000, the configuration management program 4110 determines whether the detailed information of the resources included in the storage subsystem 1000 or the host computer 2000 need to be displayed. The necessity is determined by, for example, whether the manager has requested the display through the user interface.

If the display of the detailed information of the resources is not necessary (therefore, only basic information, such as identifiers, needs to be displayed) (No in step S7000), the process moves to step S7030. On the other hand if the display of the detailed information of the resources is necessary (Yes in step S7000), the process moves to step S7010.

In step S7010, the configuration management program 4110 refers to the configuration information table group 4130 to further determine whether the detailed information of the display target resources is acquired.

If the detailed information of the display target resources is acquired (Yes in step S7010), the process moves to step S7030. On the other hand, if the detailed information of the display target resources is not yet acquired (No in step S7010), the process moves to step S7020.

In step S7020, the configuration management program 4110 instructs the information collection program 4120 to execute the information acquisition process to acquire the detailed information of the display target resources, and in response to the instruction, the information collection program 4120 acquires the detailed information of the resources. Details of the information acquisition process are as shown in FIG. 17.

In step S7030, the configuration management program 4110 displays the information of the resources through the user interface.

<Examples of User Interface>

Figure 22:
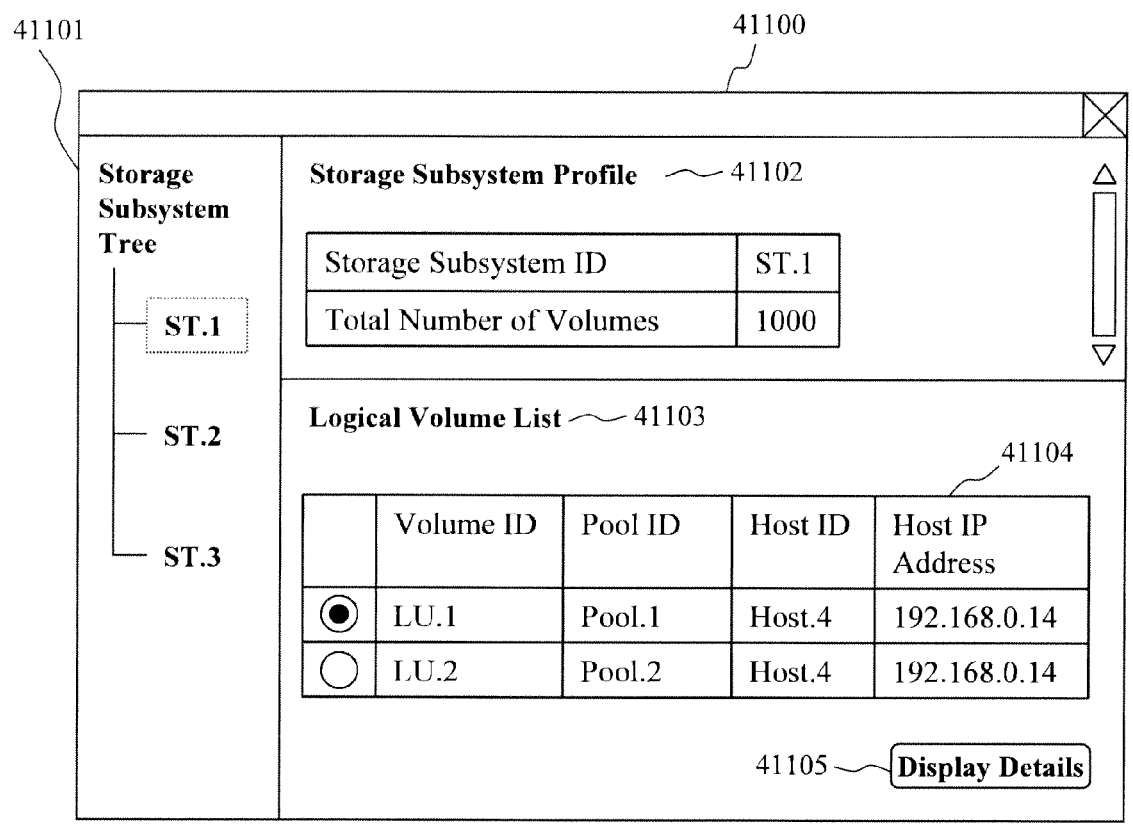
FIG. 22 is a diagram showing an example of configuration of a user interface (resource list display) according to the present invention.

FIGS. 22 and 23 are diagrams showing examples of configuration of a user interface of the configuration management program 4110 according to the embodiment of the present invention. FIG. 22 is a user interface showing list display of the resources. FIG. 23 is a user interface showing detailed display of a logical volume.

(i) In FIG. 22, a user interface 41100 of the resource list display includes, as configuration areas, a storage subsystem tree display area 41101, a storage subsystem profile display area 41102, and a logical volume list display area 41103.

The storage subsystem tree 41101, managed in the computer system 100, is an area showing the storage subsystems 1000 capable of the list display of the resources, and one of the storage subsystems 1000 can be selected. It is assumed in FIG. 22 that the manager (user) selects ST.1.

The storage subsystem profile 41102 is an area showing the total number of volumes of the selected storage subsystem. However, the area may include other information.

The logical volume list 41103 is an area for displaying a list of the logical volumes included in the selected storage subsystem and includes a logical volume listing 41104 and a detail display button 41105. The logical volume listing 41104 displays, for each logical volume, basic information including the volume ID as information for identifying the logical volume, the pool ID as information for identifying the pool to which the logical volume belongs, the host ID as information for identifying the host computer that uses the logical volume, and the host IP address as information indicating the IP address of the host computer. One logical volume can be selected by a radio button in the logical volume listing 41104, and when the detail display button 41105/215 is pressed after the selection, a detail display screen shown in FIG. 23 is displayed for the selected logical volume.

The display of FIG. 22 is performed in accordance with the process of the flow chart of FIG. 21. Since the detailed information is not necessary when the user interface is displayed based on FIG. 22, the determination result of step S7000 is No, and the configuration management program 4110 displays only the basic information of the resources. Meanwhile, as described, if the manager (user) presses the "detail display" button when one logical volume is selected, the process based on the flow chart of FIG. 21 is executed to display the "detail display screen" based on FIG. 23. Therefore, since the detailed information is necessary upon the display of FIG. 23, the determination result of step S7000 is Yes.

(ii) In FIG. 23, the user interface 41110 of the logical volume detail display includes, as display items, logical volume information 41111 including the detailed information of the target logical volume, cut-out source pool information 41112 including the detailed information of the pool of the cut-out source of the target logical volume, and allocated host information 41113 as information for specifying the host computer allocated to the target logical volume.

In the logical volume information 41111, the storage sub ID and the volume ID are the basic information, and the capacity, the RAID level, and the media type are the detailed information acquired in step S7020 of FIG. 21.

In the cut-out source pool information 41112, the pool ID is basic information, and the capacity, the free capacity, and the pool type are the detailed information acquired in step S7020 of FIG. 21.

If, for example, the detailed information of LU.1 of ST.1 is not acquired (only the information of LU.1 of ST. 1 shown in FIG. 7 is included), the determination result of step S7010 of FIG. 21 is No. The detailed information of LU.1 of ST.1 is acquired in step S7020. Lastly, FIG. 23 is displayed based on the process of step S7030.

B. Second Embodiment

Configuration of Computer System

Figure 24:
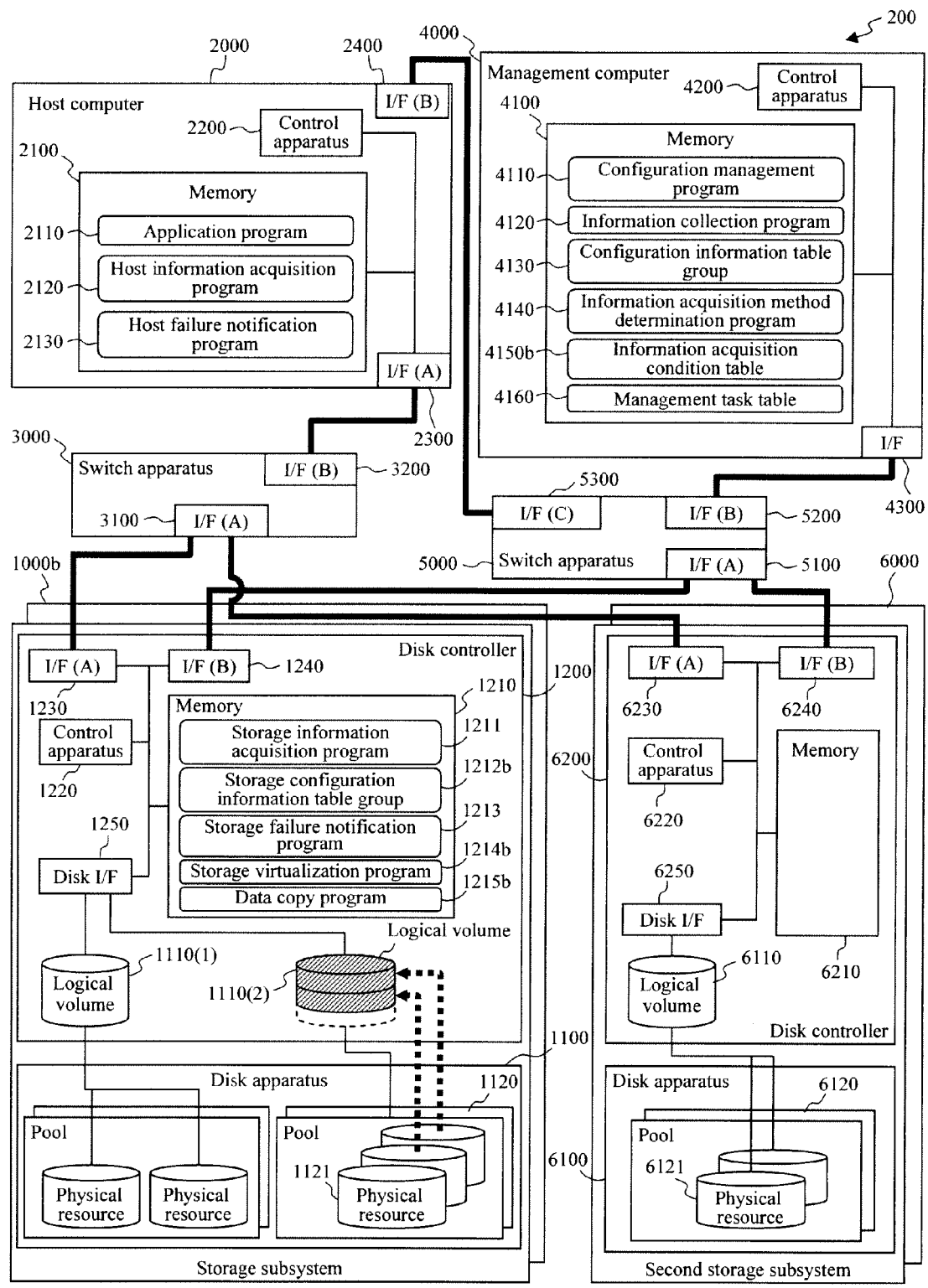
FIG. 24 is a diagram showing a schematic configuration of a computer system according to a second embodiment.

FIG. 24 is a diagram showing a schematic configuration of a computer system 200 according to a second embodiment of the present invention. The computer system 200 includes first storage subsystems 1000*b*, the host computer 2000, the switch apparatus 3000, a management computer 4000*b*, the switch apparatus 5000, and second storage subsystems 6000. In FIG. 24, there are two first storage subsystems 1000*b*, two second storage subsystems 6000, one host computer 2000, one switch apparatus 3000, one management computer 4000*b*, and one switch apparatus 5000. However, the arrangement is not limited to this as long as there is one or more of each component. Most of the configuration is the same as the configuration of the first embodiment, and only the differences will be described.

The differences from the computer system 100 shown in FIG. 1 are that the first storage subsystem 1000*b* includes a storage virtualization program 1214*b* and a data copy program 10
b, a table constituting a storage configuration information table group 1212*b* is different, and the configuration of an information acquisition condition table 4150*b* included in the management computer 4000*b* is different. The configuration of the second storage subsystems 6000 are the same as that of the first storage subsystems 1000, and the description will not be repeated.

The storage virtualization program 1214*b* is a program for realizing a virtualization function. Specifically, the storage virtualization program 1214*b* has a function of mapping logical volumes 6110 in the second storage subsystems 6000 connected through the switch apparatus 3000 to the logical volumes 1110 in the first storage subsystems 1000*b*. As a result, the logical volumes 6110 of the second storage subsystems 6000 can be provided to the host computer 2000 as logical volumes of the first storage subsystems 1000*b*. In the present embodiment, for example, virtualization functions disclosed in Patent Literatures 2 and 3 can be used. The virtualization function may be realized by the switch apparatus 3000. The first storage subsystems 1000*b* and the second storage subsystems 6000 may be in a one-to-one relationship, one-to-many relationship, many-to-one relationship, or many-to-many relationship.

The data copy program 1215b is a program for copying data stored in a logical volume to another logical volume. The logical volume of the copy source and the logical volume of the copy destination may be on the same storage subsystem or may be on a different storage subsystem. For example, in copying of data from the logical volume 1110(1) to the logical volume 1110(2) on the first storage subsystem 1000b, the copy of the data by the program is realized by transferring the data through the disk I/F 1250 of the first storage subsystem 1000b. Meanwhile, in copying of data from the logical volume 1110 on the first storage subsystem 1000b to the logical volume 6110 on the second storage subsystem 6000, the copy of the data by the program is realized by transferring the data through the I/F(A) 1230 of the first storage subsystem 1000b, the I/F(A) 3100 included in the switch apparatus 3000, and an I/F(A) 6230 of the second storage subsystem 6000.

<Storage Configuration Information Table Group>

Figures 25, 26:
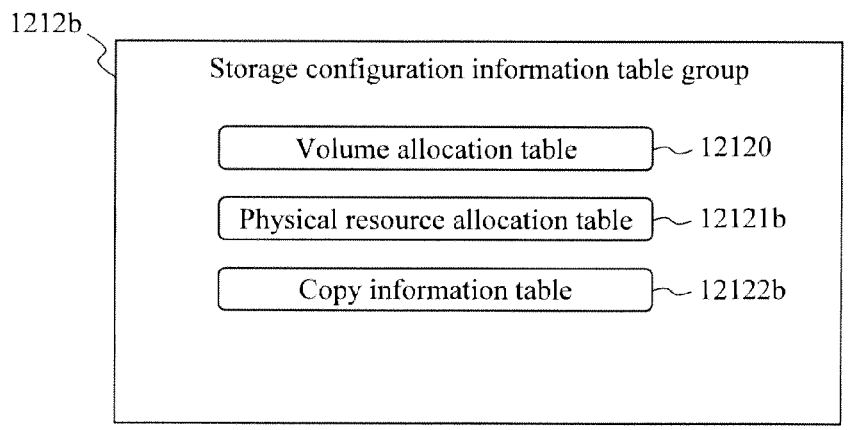
FIG. 25 is a diagram showing an example of configuration of a storage configuration information table group according to the second embodiment.
FIG. 26 is a diagram showing an example of configuration of a physical resource allocation table according to the second embodiment.

FIG. 25 is a diagram showing an example of configuration of the storage configuration information table group 1212b according to the second embodiment.

The differences between the storage configuration information table group 1212 shown in FIG. 2 and the storage configuration information table group 1212b shown in FIG. 25 are that the configuration of a physical resource allocation table 12121b is different from that of the physical resource allocation table 12121 in the first embodiment, and the storage configuration information table group 1212b includes a copy information table 12122b.

<Example of Detailed Configuration of Physical Resource Allocation Table>

FIG. 26 is a diagram showing an example of configuration of the physical resource allocation table 12121b according to the second embodiment.

The differences between the physical resource allocation table 12121 shown in FIG. 4 and the physical resource allocation table 12121b shown in FIG. 26 are that the physical resource allocation table 12121b includes a storage ID 121213b for identifying the storage subsystems, and a resource ID 121214b is included in place of the physical resource ID 121213.

In the present embodiment, not only the storage regions of the physical resources 1121 included in the first storage subsystems 1000b, but also the storage regions of the logical volumes 6110 included in the second storage subsystems 6000 can be allocated to the segments of the logical volumes 1110. Therefore, if the storage regions of the logical volumes 6110 included in the second storage subsystems 6000 are allocated to the segments of the logical volumes 1110 (for example, a line with an LUN 121210b is "3" and a segment ID 121211b "1" in FIG. 26), the information identifying the second storage subsystems 6000 is stored in the storage ID 121213b, and the information identifying the logical volumes 6110 included in the second storage subsystems 6000 is stored in the resource ID 121214b.

As in the first embodiment, if the storage regions of the physical resources 1121 included in the storage subsystems 1000b are allocated to the segments of the logical volumes 1110, the information identifying the first storage subsystems 1000b is stored in the storage ID 121213b, and the information identifying the physical resources 1121 is stored in the resource ID 121214b. The method of showing the relationship between virtualization and non-virtualization based on the storage virtualization program is not limited to the expression of FIG. 26, and other methods may be used.

<Example of Detailed Configuration of Copy Information Table>

FIG. 27 is a diagram showing an example of detailed configuration of the copy information table 12122b according to the second embodiment. The copy information table 12122b is a table storing information related to copying between the logical volumes.

The copy information table 12122b includes a copy source storage ID 121220b for identifying the storage subsystems including the logical volumes of copy source, a copy source LUN 121221b for identifying the logical volumes of copy source, a copy destination storage ID 121222b for identifying the storage subsystems including the logical volumes of copy destination, a copy destination LUN 121223b for identifying logical volumes of copy destination, and a copy type 121224b indicating the types of copying. Examples of the types of copying include "mirror" and "clone". The "mirror" is a copy type of reflecting written data to the logical volumes of copy destination if there is writing to the logical volumes of copy source from the host computer 2000 after the completion of copying of data from the logical volumes of copy source to the logical volumes of copy destination. The "clone" is a copy type of not reflecting written data to the logical volumes of copy destination if there is writing to the logical volumes of copy source from the host computer 2000 after the completion of copying from the logical volumes of copy source to the logical volumes of copy destination.

The information of the copy information table 12122b is not limited to the information shown in FIG. 25, and other information related to copying between the logical volumes may be stored.

<Example of Configuration of Information Acquisition Condition Table>

FIG. 28 is a diagram showing an example of configuration of the information acquisition condition table 4150b according to the second embodiment. The difference between the information acquisition condition table 4150 according to the first embodiment and the information acquisition condition table 4150b according to the second embodiment is that the information acquisition condition table 4150b includes information acquisition conditions and information acquisition methods related to storage virtualization and configurations of copying across the storage subsystems.

<Content of Data Processing>

Most of the processes in the present embodiment are the same as the processing content of the first embodiment, and only the difference will be described. The flow charts for explaining the processes of the present embodiment are similar to the flow charts of the first embodiment. The difference between the processes in the first embodiment and the processes in the second embodiment is that the information stored in the information acquisition condition table 4150b shown in FIG. 28 is different from the information stored in the information acquisition condition table 4150 shown in FIG. 13, and therefore, the result of the process by the information acquisition method determination program 4140 determining the range and timing of acquiring the detailed information is different.

For example, the information acquisition condition table 4150b includes an information acquisition method of always holding the detailed information of all resources included in the storage subsystems in which one or more volumes are directly allocated to an arbitrary host computer, as in a line with a condition ID 41500b "1". For example, if all logical volumes 6110 included in the second storage subsystems 6000 are virtualized as the logical volumes included in the storage subsystems 1000b, the logical volumes 6110 included in the second storage subsystems 6000 are not directly allocated to the host computer 2000. In that case, the information acquisition method determination program 4140*b* instructs the information collection program 4120 not to acquire the detailed information of the second storage subsystems 6000 in the present embodiment.

The control has, for example, the following advantages. In general, the timing of the management operation for virtualizing the logical volumes 6110 included in the second storage subsystems 6000 as the logical volumes included in the storage subsystems 1000*b* tends to have temporal variations in relation to the operation time of the computer system 200. More specifically, for example, there is a case of carrying out management operations for virtualizing a plurality of or all of the logical volumes 6110 included in the second storage subsystems 6000 all at once when the second storage subsystems 6000 are implemented. In general, the host computer 2000, the storage subsystems 1000*b*, and the switch apparatus 3000 connecting the host computer 2000 and the storage subsystems 1000*b* are often the main targets of the management operations in the operation of the computer system 200. There are cases in which the second storage subsystems 6000 are the targets of the management operations only when, for example, there is a failure. Furthermore, there is a tendency that the number of the second storage subsystems 6000 is generally greater than the number of the storage subsystems 1000*b*. On the basis of the general tendencies, as the condition indicated in the line with the condition ID 41500*b* "1" in the information acquisition condition table 4150*b* is included, the management computer 4000 does not always have to hold the configuration information of the large number of second storage subsystems 6000 that are not frequently subjected to the management operations. Therefore, the computer system 200 can be efficiently managed.

In the information acquisition condition table 4150*b*, the information stored in the information acquisition method 41502 may be different from the information stored in the information acquisition method 41502 in the first embodiment even if the information stored in the information acquisition condition 41501*b* and the information stored in the information acquisition condition 41501 in the first embodiment are the same, as in the lines with the condition ID 41500*b* "2" and "3". Specifically, only the storage subsystems 1000 as the information acquisition targets are the determination targets of the information acquisition method in the information acquisition method 41502 in the first embodiment, while the first storage subsystems 1000*b* as the information acquisition targets and the second storage subsystems 6000 related to the storage subsystems are the determination targets of the information acquisition method in the information acquisition method 41502*b* of the second embodiment.

C. Third Embodiment

Configuration of Computer System

Figure 29:
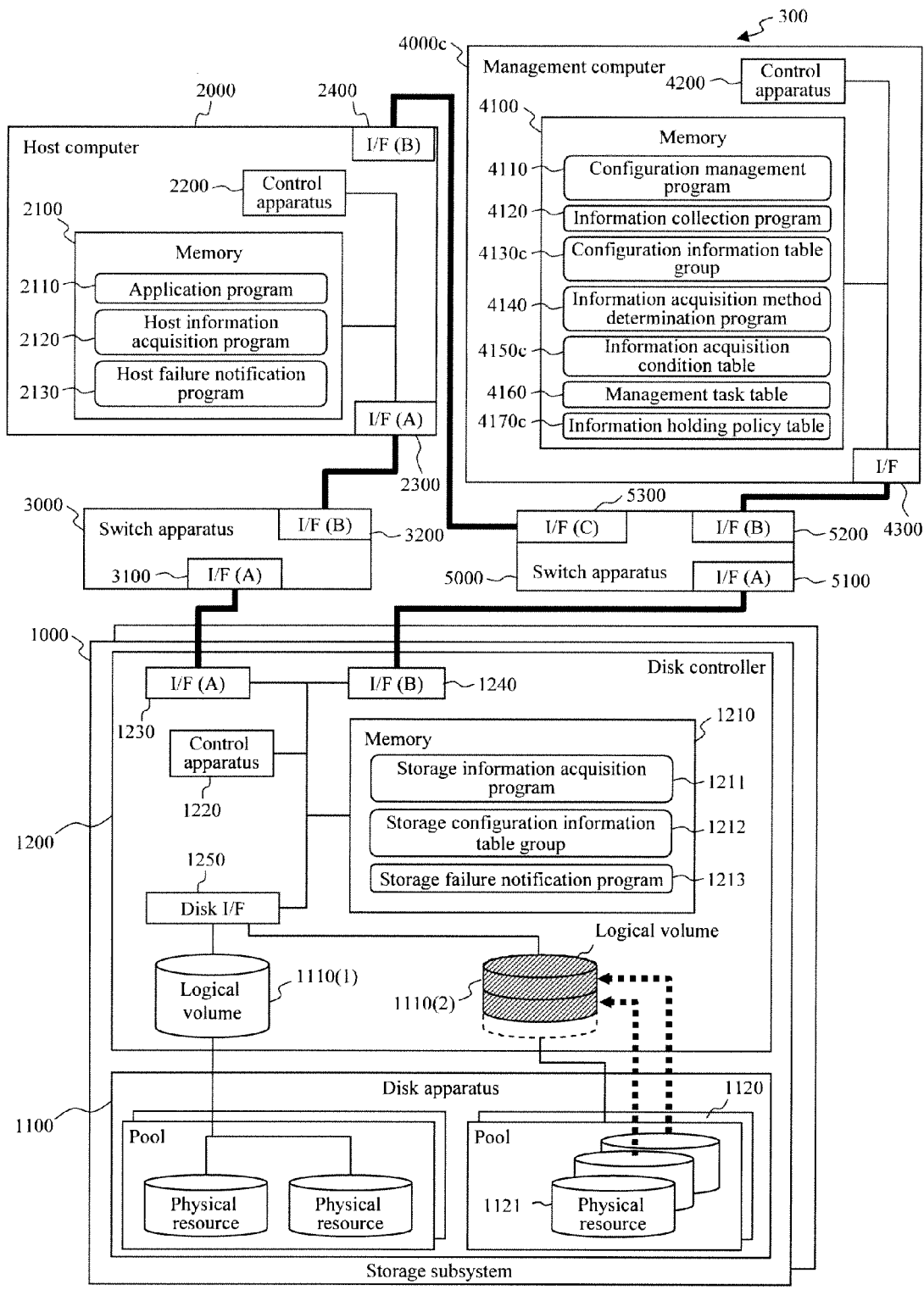
FIG. 29 is a diagram showing a schematic configuration of a computer system according to a third embodiment.

FIG. 29 is a diagram showing a schematic configuration of a computer system 300 according to a third embodiment of the present invention. The computer system 300 includes the storage subsystems 1000, the host computer 2000, the switch apparatus 3000, a management computer 4000*c*, and the switch apparatus 5000. In FIG. 29, there are two storage subsystems 1000, one host computer 2000, one switch apparatus 3000, one management computer 4000*c*, and one switch apparatus 5000. However, the arrangement is not limited to this as long as there is one or more of each component. Most of the present configuration is the same as the configuration of the first embodiment, and only the differences will be described.

The differences from the computer system 100 shown in FIG. 1 are that an information last update date/time table 4138*c* is included in a configuration information table group 4130*c* (see FIG. 30) included in the management computer 4000*c*, the configuration of an information acquisition condition table 4150*c* included in the management computer 4000*c* is different from the configuration of the information acquisition condition table 4150 in the first embodiment, and the management computer 4000*c* includes an information holding policy table 4170*c*.

<Example of Configuration of Information Last Update Date/Time Table>

Figures 30, 31:
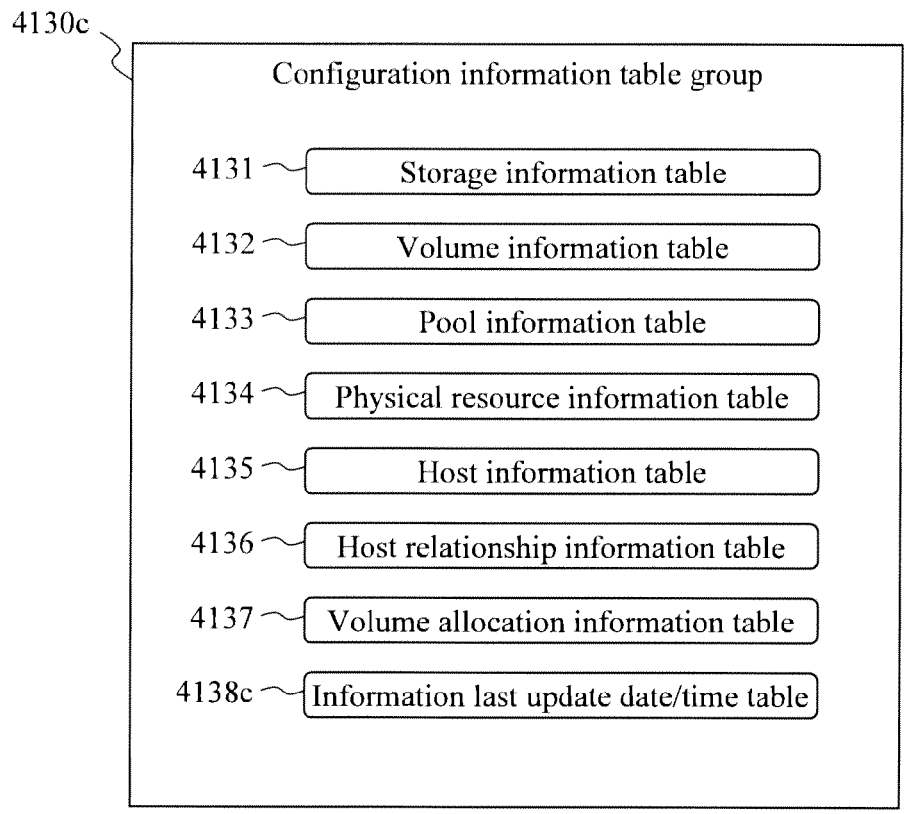
FIG. 30 is a diagram showing an example of configuration of a configuration information table group according to the third embodiment.
FIG. 31 is a diagram showing an example of configuration of an information last update date/time table according to the third embodiment.

FIG. 31 is a diagram showing an example of configuration of the information last update date/time table 4138*c* according to the third embodiment. The information last update date/time table 4138*c* is a table included in the configuration information table group 4130*c* shown in FIG. 30 and includes information indicating date/time of the last acquisition of the configuration information of the storage subsystems 1000 and the host computers 2000 by the information collection program 4120.

The information last update date/time table 4138*c* includes, as configuration items, a constituent element ID 41380*c* for identifying constituent elements included in the storage subsystems 1000 and the host computers 2000 and an information last update date/time 41381*c* indicating date/time of the last acquisition of the information of the constituent elements by the information collection program 4120. In the present embodiment, the constituent element ID 41380*c* stores information connecting, by a symbol ":", information for uniquely identifying the lines in the tables included in the configuration information table group 4130*c*. However, the information is not limited to this as long as the information uniquely identifies the constituent elements included in the storage subsystems 1000 and the host computers 2000.

<Example of Configuration of Information Acquisition Condition Table>

FIG. 32 is a diagram showing an example of configuration of the information acquisition condition table 4150*c* according to the third embodiment.

The difference between the information acquisition condition table 4150 shown in FIG. 13 and the information acquisition condition table 4150*c* shown in FIG. 32 is that the information acquisition condition table 4150*c* includes an information holding policy ID 41504*c*. The information holding policy ID 41504*c* is information for uniquely specifying the lines of the information holding policy table 4170*c*.

<Example of Configuration of Information Holding Policy Table>

FIG. 33 is a diagram showing an example of configuration of the information holding policy table 4170*c* according to the third embodiment. The information holding policy table 4170*c* is information showing policies related to methods of holding and discarding (rules defining methods of holding and discarding) the configuration information (detailed information) of the storage subsystems 1000 and the host computers 2000 acquired by the information collection program 4120.

The information holding policy table 4170*c* includes a policy ID 41700*c* for uniquely identifying the information holding policies, a periodic update interval of condition corresponding information 41701*c* indicating time intervals of the information collection program 4120 periodically updating the information corresponding to the information acquisition condition 41501c of the information acquisition condition table 4150c, a storage location of condition corresponding information 41702c indicating storage locations of the information corresponding to the information acquisition condition 41501c of the information acquisition condition table 4150c, a discard timing of condition corresponding information 41703c indicating the timing of discarding the information corresponding to the information acquisition condition 41501c of the information acquisition condition table 4150c, a storage location of condition non-corresponding information 41704c indicating storage locations when the information not corresponding to the information acquisition condition 41501c of the information acquisition condition table 4150c is acquired later, and a discard timing of condition non-corresponding information 41705c indicating the timing of discarding the information when the information not corresponding to the information acquisition condition 41501c of the information acquisition condition table 4150c is acquired later.

<Content of Data Processing>

Most of the processes in the present embodiment are the same as the processing content of the first embodiment, and only the differences will be described. The differences between the data processing in the first embodiment and the data processing in the present embodiment are that the sequence of the process by the information collection program 4120 acquiring the information of the storage subsystems 1000 and the host computers 2000 is different, and the configuration management program 4110 instructs the information collection program 4120 to periodically update the information of the storage subsystems 1000 and the host computers 2000 in the present embodiment. The differences will be described below.

<Details of Information Acquisition Process>

Figure 34:
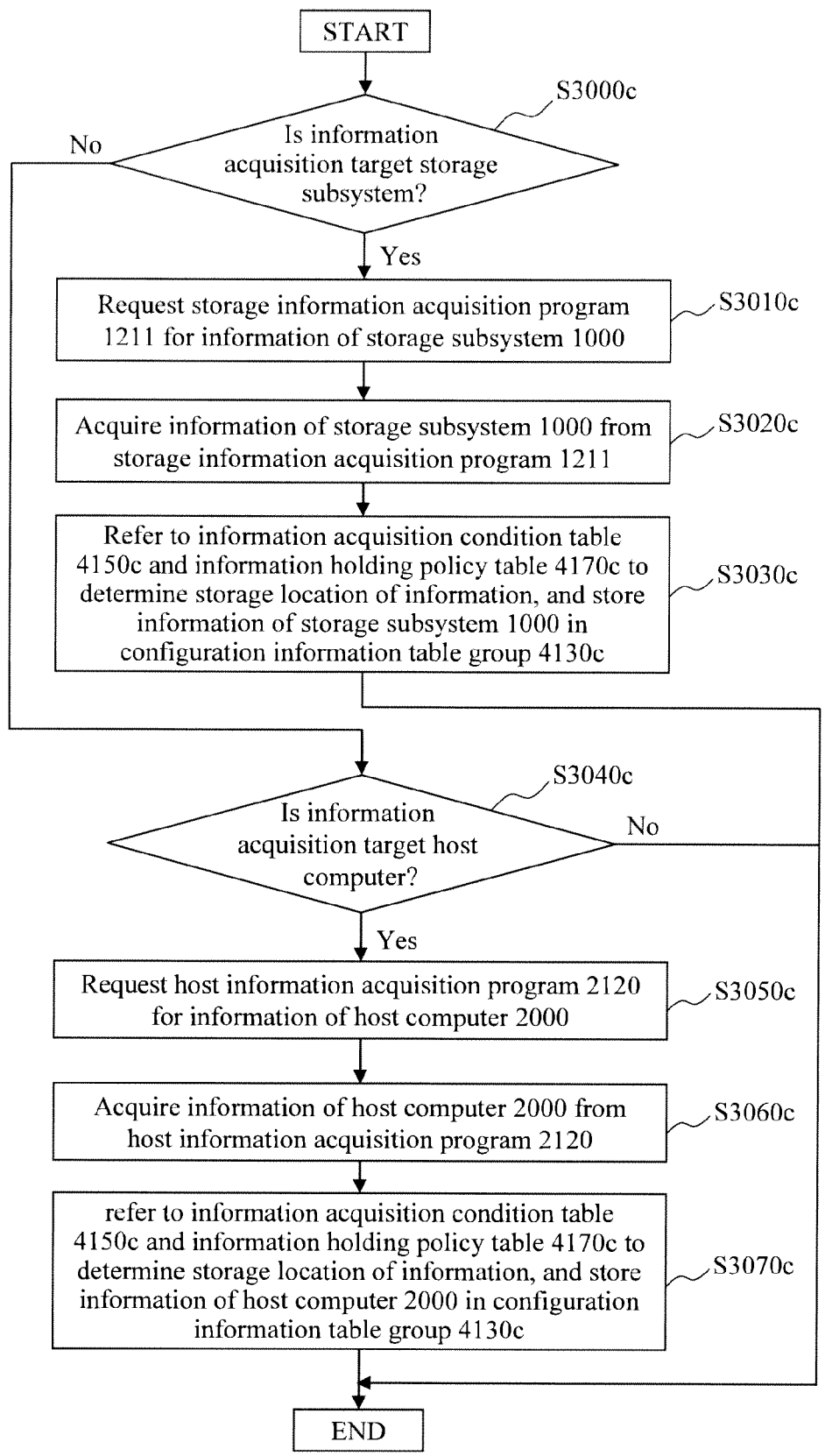
FIG. 34 is a flow chart for explaining a process by the management software acquiring information from the storage subsystem or the host computer according to the third embodiment.

FIG. 34 is a flow chart for explaining a process when the information collection program 4120 acquires the information of the storage subsystem 1000 or the host computer 2000 according to the third embodiment. Steps S3000c, S3010c, S3020c, S3040c, S3050c, and S3060c of the information acquisition process shown in FIG. 34 are the same as steps S3000, S3010, S3020, S3040, S3050, and S3060 of the information acquisition process shown in FIG. 17, and the description will not be repeated.

In the information acquisition process shown in FIG. 34, the information collection program 4120 refers to the information acquisition condition table 4150c and the information holding policy table 4170c in step S3030c to determine the storage location of the information and stores the information (detailed information) of the storage subsystems 1000 in the configuration information table group 4130c.

In step S3070c, the information collection program 4120 refers to the information acquisition condition table 4150c and the information holding policy table 4170c to determine the storage location of the information and stores the information of the host computer 2000 in the configuration information table group 4130c.

As a result of the process, the information of the storage subsystem 1000 or the host computer 2000 acquired by the information collection program 4120 can be stored in storage location media (secondary storage device such as a memory and an HDD) compliant with the information holding policy (see FIG. 33).

<Periodical Information Update Process>

Figure 35:
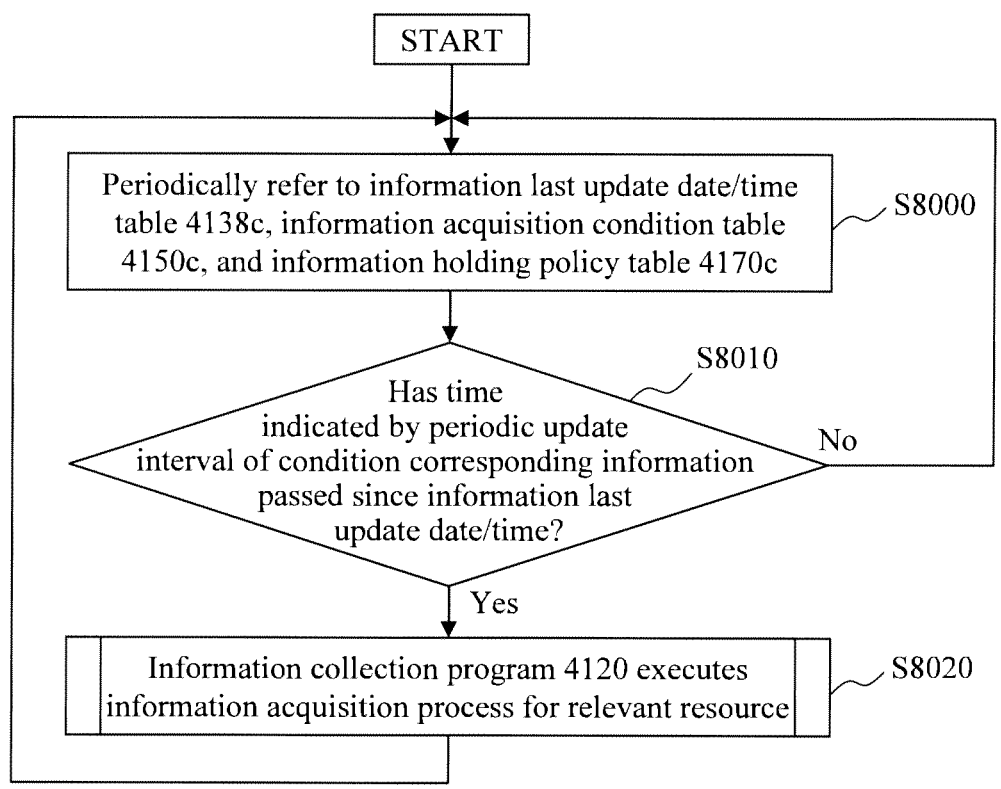
FIG. 35 is a flow chart for explaining a process by the management software periodically acquiring information from the storage subsystem or the host computer according to the third embodiment.

FIG. 35 is a flow chart for explaining a process when the configuration management program 4110 instructs the information collection program 4120 to periodically update the information of the storage subsystems 1000 and the host computers 2000 according to the third embodiment. The process shown in FIG. 35 is executed in a different thread from the other processes of the configuration management program 4110. Therefore, the process of FIG. 35 is executed in parallel with the other processes.

In step S8000, the configuration management program 4110 periodically refers to the information last update date/time table 4138c, the information acquisition condition table 4150c, and the information holding policy table 4170c.

In step S8010c, the configuration management program 4110 determines whether the time indicated by the periodic update interval of condition corresponding information 41701c of the information holding policy table 4170c has passed since the information last update date/time 41381c of the information last update date/time table 4138c.

If the time indicated by the periodic update interval of condition corresponding information 41701c of the information holding policy table 4170c has passed the information last update date/time 41381c of the information last update date/time table 4138c (Yes in step S8010), the process moves to step S8020. On the other hand, if the time indicated by the periodic update interval of condition corresponding information 41701c of the information holding policy table 4170c has not passed the information last update date/time 41381c of the information last update date/time table 4138c (No in step S8010), the process moves to step S8000.

In step S8020, the configuration management program 4110 instructs the information collection program 4120 to execute the information acquisition process in relation to the resource, and in response to the instruction, the information collection program 4120 acquires the detailed information of the resource. Details of the process of step 8020 are as shown in FIG. 34.

As a result of the process, the information of the storage subsystems 1000 and the host computers 2000 can be periodically updated at a time interval compliant with the information holding policy.

D. Conclusion (1) First Embodiment

A management computer (management software) first acquires basic configuration information (including only fixed information in which values do not change for an object as a management target during system operation) at least including identifiers of constituent elements of storage devices and host computers as well as correspondence relationships between the constituent elements, when, for example, the information is set. Based on a detailed information acquisition rule (information acquisition condition table: see FIG. 13) indicating acquisition conditions and acquisition methods for acquiring detailed configuration information (information necessary to monitor and manage the object as the management target) of the constituent elements that includes information in which values change as the storage system (computer system) is operated, the management computer acquires the detailed configuration information corresponding to the basic configuration information. The detailed information acquisition rule may be constituted by combinations of the plurality of acquisition conditions and the plurality of acquisition methods corresponding to the acquisition conditions, and information of the acquisition methods may include information related to a range and timing of acquiring the detailed configuration information. In this case, the management computer determines, for each of the plurality of acquisition conditions, whether there is the constituent element satisfying the acquisition condition and acquires the detailed configuration information based on the determination result and the corresponding acquisition method. As a result, the range and timing of holding the detailed information in the configuration information of the storage system can be appropriately controlled, and therefore, the management software can efficiently manage the storage system even if the storage system is enlarged. The targets managed by the management software are not limited to the storage subsystems, the host computers, the switches, and the hubs, but may include application programs and the like operated on the host computer.

The management computer acquires the detailed configuration information of all constituent elements in one or more storage subsystems and one or more host computers if none of the plurality of acquisition conditions is satisfied. As a result, mistakes in acquiring the detailed information can be prevented.

The management computer may hold at least management task information (see FIG. 14) defining a management target and content of a task for the management target. In this case, the management computer checks whether the detailed configuration information necessary to execute each task included in the management task information is acquired. The management computer then acquires missing detailed configuration information from at least one of the storage subsystems and the host computers before execution of the task. As a result, configuration information of the management target (such as creation and copying of logical volumes) changed by a management operation can be entirely and surely acquired before the management task.

The management computer lists the basic configuration information on a display screen through a user interface related to list display of resources. When the manager (user) selects a management target (for example, logical volume), for which the user wants to display details on the user interface of the list display, the management computer displays the detailed configuration information of the constituent element on a display screen through a user interface of detailed display in response to the selection operation. As a result, the management target that the manager wants to know can be provided to the manager in an easily viewable way.

(2) Second Embodiment

The computer system includes: a first storage subsystem that directly provides logical volumes of the first storage subsystem to the host computers; and a second storage subsystem virtualized to provide at least one logical volume to the host computers as a logical volume of the first storage subsystem. In this case, the management computer determines whether the second storage subsystem includes a logical volume directly allocated to the host computers in addition to the virtualized logical volume, and only if so, acquires the detailed configuration information related to the constituent elements of the second storage subsystem. On the other hand, the management computer does not acquire the detailed configuration information of the constituent elements if the second storage subsystem provides only the virtualized logical volume to the host computers. As a result, necessary detailed information can be acquired even if the storage subsystem is virtualized, and the management target can be set only if the virtualized storage subsystem is directly related to the host computer. Therefore, a device as the management target can be efficiently managed.

In relation to copying of storage (local copy or remote copy), the management computer may manage information related to the storage and the logical volume of the copy source as well as the storage and the logical volume of the copy destination.

As a result, even if there is a relationship between the storage subsystems, such as storage virtualization and copying across the storage subsystems, the management software can appropriately control the range and timing of holding the detailed information in the configuration information of the storage system. Therefore, the storage system can be efficiently managed even if the storage system is enlarged.

(3) Third Embodiment

The management computer includes an information holding policy defining a rule related to at least a storage location and discard of the detailed configuration information (basic information may be managed) of the constituent elements and manages the storage and discard of the acquired detailed configuration information based on the information holding policy. The information holding policy includes information defining update timing (such as update period) of the detailed configuration information, and the management computer further manages update history information managing last update date/time of the detailed configuration information. The management computer compares the last update date/time and the update timing included in the information holding policy to determine necessity of the update of the detailed configuration information and acquires the detailed configuration information based on the detailed information acquisition rule if the update is necessary. As a result, the method (interval of periodical update of information and storage location of information) of holding the information of the storage subsystems and the host computers can be appropriately controlled in accordance with the policy, and the computer system can be efficiently managed even if the computer system is enlarged.

(4) Additional Aspect of the Invention

The present invention can be realized by a program code of software for realizing the functions of the embodiments. In that case, a storage medium recording the program code is provided to a system or an apparatus, and a computer (or CPU or MPU) of the system or the apparatus reads out the program code stored in the storage medium. In that case, the program code read out from the storage medium realizes the functions of the embodiments, and the program code and the storage medium storing the program code constitute the present invention. Examples of the storage medium for supplying the program code includes a flexible disk, a CD-ROM, a DVD-ROM, a hard disk, an optical disk, a magneto-optical disk, a CD-R, a magnetic tape, a nonvolatile memory card, and a ROM.

An OS (operating system) or the like operated on the computer may execute part or all of the actual processes based on an instruction of the program code, and the processes may realize the functions of the embodiments. A CPU or the like of the computer may execute part or all of the actual processes based on an instruction of the program code after the program code read out from the storage medium is written in a memory on the computer, and the processes may realize the functions of the embodiments.

The program code of the software for realizing the functions of the embodiments may be distributed through a network to store the program code in a storage section, such as a hard disk and a memory of a system or an apparatus, or in a storage medium, such as a CD-RW and a CD-R, and a computer (or CPU or MPU) of the system or the apparatus may read out the program code stored in the storage section or the storage medium upon use to execute the program code.

Lastly, it needs to be understood that the processes and the techniques described herein are essentially not related to any specific apparatuses but can be implemented by any suitable combinations of the components. Furthermore, various types of general-purpose devices can be used in accordance with the teaching described herein. It may be understood that construction of a dedicated apparatus may be beneficial to execute steps of the methods described herein. Appropriate combinations of a plurality of constituent elements disclosed in the embodiments can form various inventions. For example, some constituent elements may be deleted from all constituent elements illustrated in the embodiments. Furthermore, constituent elements across different embodiments may be appropriately combined. Although the present invention has been described in relation to specific examples, the specific examples are not for the restrictions in any sense, but are for the description. Those skilled in the art would understand that there are a multiplicity of combinations of hardware, software, and firmware suitable for carrying out the present invention. For example, the described software can be implemented by a wide range of programs or script languages, such as assembler, C/C++, perl, Shell, PHP, and JAVA (registered trademark).

In the embodiments, control lines and information lines considered necessary for the description are illustrated, and all control lines and information lines of the product may not be necessarily illustrated. All configurations may be connected to each other.

In addition, those with general knowledge of the technical field would recognize other implementations of the present invention from the examination of the disclosed description and/or embodiments of the present invention. Various modes and components of the described embodiments can be used individually or by any combinations in a computerized storage system with a function of managing data. The description and the specific examples are only typical ones, and the scope and the spirit of the present invention are illustrated in the following claims.

REFERENCE SIGNS LIST 1000, 1000b, 1000c storage subsystems
1100 disk apparatus
1110 logical volume
1120 pool
1121 physical resource
1200 disk controller
1210 memory
1211 storage information acquisition program
1212, 1212b storage configuration information table groups
1213 storage failure notification program
1214b storage virtualization program
1215b data copy program
1220 control apparatus
1230 I/F(A)
1240 I/F(B)
1250 disk I/F
2000 host computer
2100 memory
2110 application program
2120 host information acquisition program
2130 host failure notification program
2200 control apparatus
2300 I/F(A)
2400 I/F(B)
3000 switch apparatus
3100 I/F(A)
3200 I/F(B)
4000, 4000b management computers
4100 memory
4110 configuration management program
4120 information collection program
4130, 4130c configuration information table groups
4131 storage information table
4132 volume information table
4133 pool information table
4134 physical resource information table
4135 host information table
4136 host relationship information table
4137 volume allocation information table
4138c information last update date/time table
4140 information acquisition method determination program
4150, 4150b, 4150c information acquisition condition tables
4160 management task table
4170c information holding policy table
4200 control apparatus
4300 I/F
5000 switch apparatus
5100 I/F(A)
5200 I/F(B)
5300 I/F(C)
6000 second storage subsystem
6100 disk apparatus
6110 logical volume
6120 pool
6121 physical resource
6200 disk controller
6210 memory
6220 control apparatus
6230 I/F(A)
6240 I/F(B)
6250 disk I/F

The invention claimed is:

1. A computer system comprising:
a storage device comprising a physical resource and a storage region constituted by the physical resource;
a host computer comprising a storage region allocated from the storage device; and
a management computer configured to manage the storage device and the host computer and storing an acquisition rule,
wherein the acquisition rule includes a plurality of acquisition conditions and a plurality of acquisition methods corresponding to the acquisition conditions, and
wherein the management computer is configured to:
acquire a basic configuration information which does not change as the computer system is operated;
determine whether a component of the computer system satisfies each of the plurality of acquisition conditions; and
acquire, in response to the determination that there is a component that satisfies each of the plurality of acquisition conditions, a detailed configuration information which changes as the system is operated in accordance with a method and a range described in each acquisition method of the acquisition rule.

2. The computer system according to claim 1, wherein in the acquiring of the detailed configuration information, in response to the determination that, for all of the acquisition conditions, there is no component satisfying any one of the acquisition conditions, the management computer is configured to acquire the detailed configuration information of all components in the storage device and the host computer.

3. The computer system according to claim 1, wherein the management computer is configured to:
hold at least management task information defining a management target and content of a task for the management target;
check whether the detailed configuration information necessary to execute the task included in the management task information is acquired; and
acquire missing detailed configuration information from at least one of the storage devices and the host computers before execution of the task.

4. The computer system according to claim 1, wherein the management computer is configured to:
list the component basic configuration information on a display screen through a first user interface; and,
in response to a selection by a user performed through the first user interface, display the detailed configuration information of the components on the display screen through a second user interface different from the first user interface.

5. The computer system according to claim 1, further comprising:
a first storage device configured to directly provide logical volumes of the first storage device to the host computer; and
a second storage device configured to be virtualized to provide at least one logical volume to the host computer as a logical volume of the first storage device,
wherein the management computer is configured to:
acquire the detailed configuration information related to the components of the second storage device only when the second storage device includes a logical volume directly allocated to the host computers in addition to the virtualized logical volume; and
not acquire the detailed configuration information of the components when the second storage device provides only the virtualized logical volume to the host computer.

6. The computer system according to claim 1, wherein the management computer includes an information holding policy defining a rule related to at least storage and discard of the detailed configuration information of the components and manages the storage and discard of the acquired detailed configuration information based on the information holding policy.

7. The computer system according to claim 6, wherein the information holding policy includes information defining update timing of the detailed configuration information, and
the management computer includes update history information managing last update date/time of the detailed configuration information, determines necessity of the update of the detailed configuration information based on the last update date/time and the update timing included in the information holding policy, and acquires the detailed configuration information based on the detailed information acquisition rule if the update is necessary.

* * * * *